US011761813B2

(12) United States Patent
Tetreault

(10) Patent No.: US 11,761,813 B2
(45) Date of Patent: Sep. 19, 2023

(54) WEIGHING SYSTEM AND METHOD

(71) Applicant: Bell Textron Inc., Fort Worth, TX (US)

(72) Inventor: Simon Tetreault, Sainte-Thérèse (CA)

(73) Assignee: Textron Innovations Inc., Providence, RI (US)

(*) Notice: Subject to any disclaimer, the term of this patent is extended or adjusted under 35 U.S.C. 154(b) by 232 days.

(21) Appl. No.: 17/073,195

(22) Filed: Oct. 16, 2020

(65) Prior Publication Data

US 2022/0120604 A1 Apr. 21, 2022

(51) Int. Cl.
| | |
|---|---|
| *G01G 19/14* | (2006.01) |
| *G01G 21/22* | (2006.01) |
| *G01G 23/01* | (2006.01) |
| *G01G 21/23* | (2006.01) |
| *G01G 23/36* | (2006.01) |

(52) U.S. Cl.
CPC ............ *G01G 19/14* (2013.01); *G01G 21/22* (2013.01); *G01G 21/23* (2013.01); *G01G 23/01* (2013.01); *G01G 23/361* (2013.01)

(58) Field of Classification Search
CPC ...... G01G 19/08; G01G 19/086; G01G 19/14; G01G 21/22; G01G 21/23; G01G 23/01; G01G 23/361
See application file for complete search history.

(56) References Cited

U.S. PATENT DOCUMENTS

| | | | | |
|---|---|---|---|---|
| 4,839,835 A | * | 6/1989 | Hagenbuch | G07C 5/008 |
| | | | | 701/1 |
| 5,384,436 A | * | 1/1995 | Pritchard | G01G 19/12 |
| | | | | 177/136 |
| 5,837,945 A | * | 11/1998 | Cornwell | G01G 19/083 |
| | | | | 177/25.14 |
| 9,739,656 B2 | | 8/2017 | Kieser et al. | |
| 2004/0200644 A1 | * | 10/2004 | Paine | G01G 19/083 |
| | | | | 177/136 |
| 2019/0317048 A1 | | 10/2019 | Ferdous et al. | |

FOREIGN PATENT DOCUMENTS

| | | |
|---|---|---|
| DE | 102008012566 B4 | 6/2011 |
| EP | 3511252 A1 | 7/2019 |
| WO | 02097381 A1 | 12/2002 |

OTHER PUBLICATIONS

Canadian Exam Report in related Canadian Patent Application No. 3101756 dated Jan. 20, 2022, 5 pages.
Canadian Exam Report in related Canadian Patent Application No. 3101770 dated Jan. 24, 2022, 5 pages.
Canadian Exam Report in related Canadian Patent Application No. 3101698 dated Mar. 10, 2022, 5 pages.

* cited by examiner

*Primary Examiner* — Randy W Gibson
(74) *Attorney, Agent, or Firm* — Lightfoot & Alford PLLC

(57) ABSTRACT

A weighing system includes a support, a load cell mounted to the support, and a part platform suspended from the load cell to receive a part to be weighed. The load cell is operable to generate thousands of weight values for the part per second over a period of less than twenty seconds. The load cell is operable to output a weight of the part by averaging the weight values over the period of less than twenty seconds. A method of weighing the part suspended from the load cell is also disclosed.

19 Claims, 19 Drawing Sheets

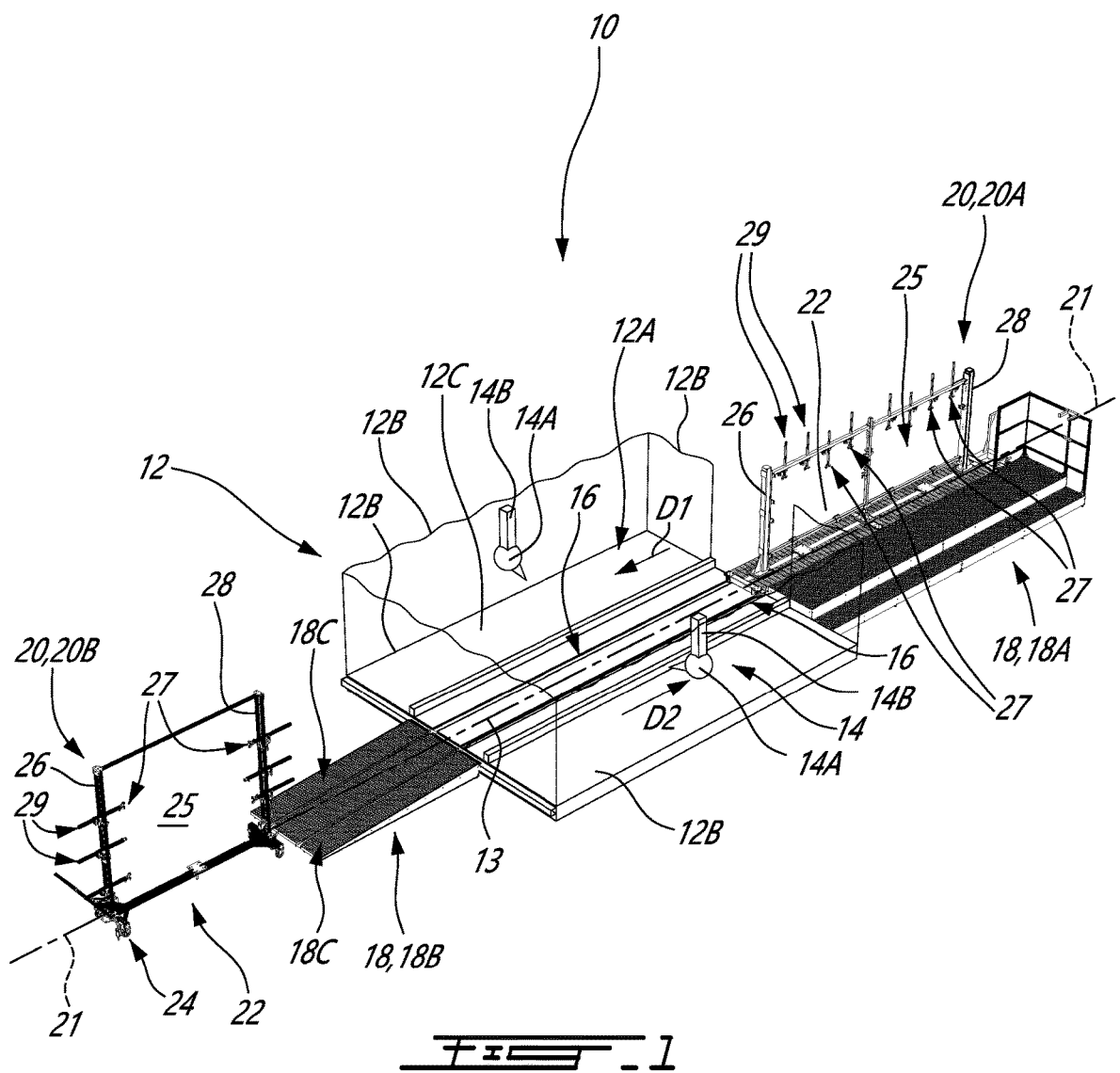

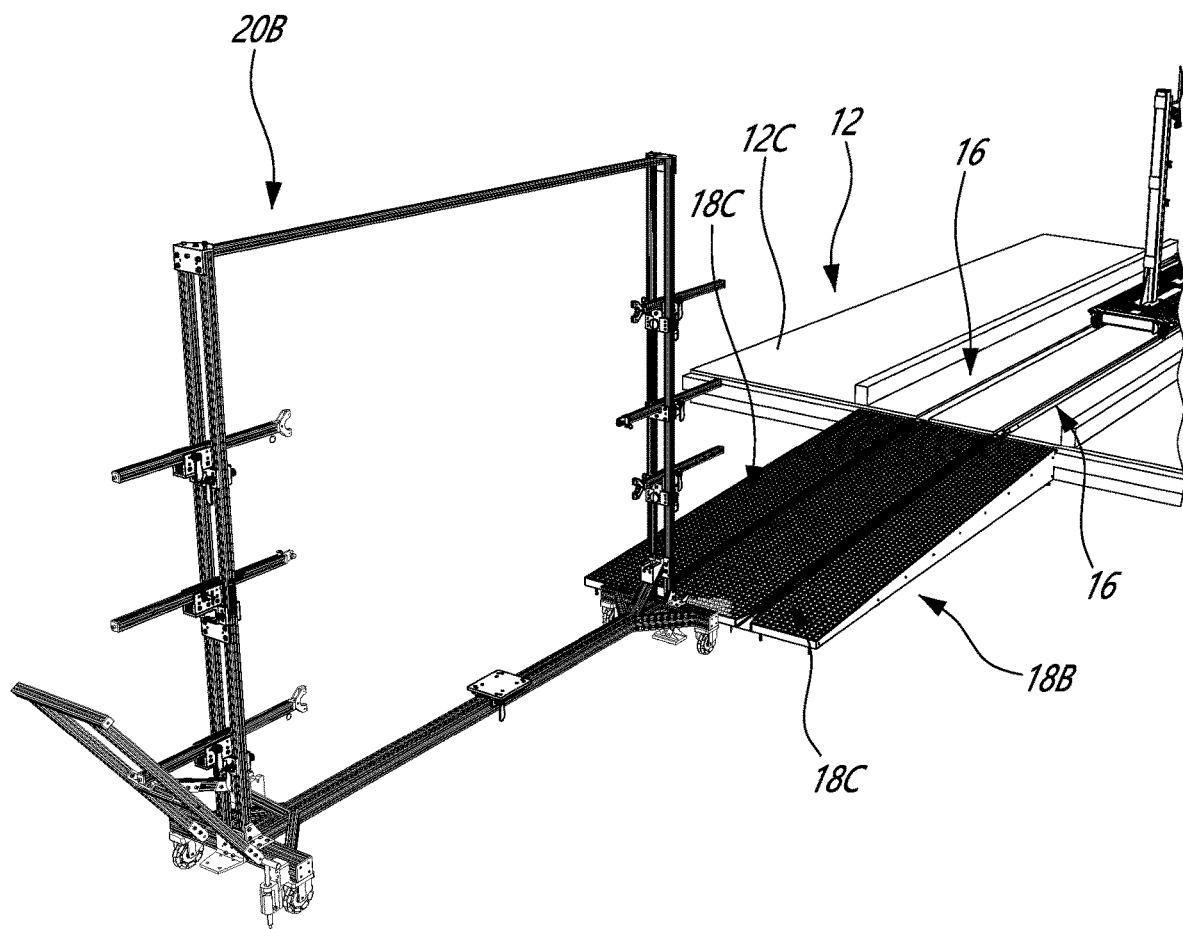

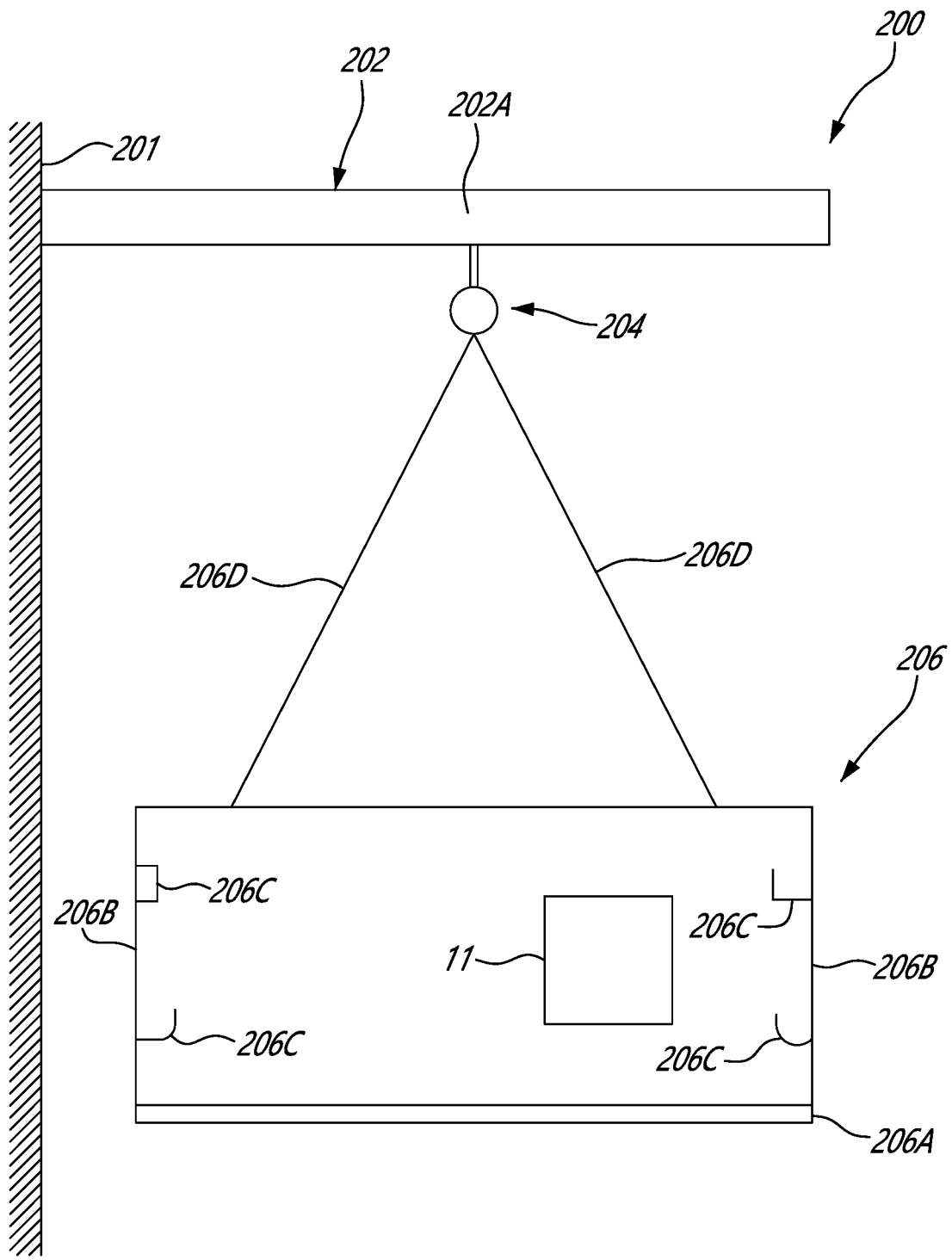

WEIGHING SYSTEM AND METHOD

TECHNICAL FIELD

The application relates generally to non-destructive testing and inspection.

BACKGROUND

Non-destructive testing (NDT) is an analysis technique used to analyse the properties of a component without causing damage to the component. In aerospace applications, for example, NDT may be used to determine whether a defect or discontinuity is present within the interior of a component. NDT is sometimes also referred to as non-destructive examination (NDE), non-destructive inspection (NDI) and non-destructive evaluation (NDE).

Performing NDT manually, where an inspector manually analyzes the component, is time consuming, costly, repetitive, and may create health and safety issues. Furthermore, training an inspector takes many hours and requires frequent recertification.

Some machines and other systems are used to automate and digitize part of the NDT process. However, where the machine is being used to analyze different components, it may need to be programmed for each component, which is time consuming.

SUMMARY

There is disclosed a non-destructive testing (NDT) machine for use with a part, the NDT machine comprising: a body defining an enclosure to receive the part, non-destructive testing equipment displaceable within the enclosure, and guide rails extending along a bottom of the body; an access platform outside of the body having access guide rails aligned with the guide rails of the body; and a cart having a base with wheels, a first support extending upright from the base, a second support extending upright from the base and spaced apart from the first support, and mounting fixtures being removably attachable to the first and second supports and having mounting ends engageable with the part to support the part from the first support or the second support, the wheels of the base being displaceable along the guide rails of the body and along the access guide rails of the access platform to displace the cart into and out of enclosure, displacement of the cart being prevented upon portions thereof being within the enclosure to secure the cart in position.

There is disclosed a cart for supporting a part to be inspected in a non-destructive testing (NDT) machine, the cart comprising: a base with wheels, a first support extending upright from the base, a second support extending upright from the base and spaced apart from the first support, and mounting fixtures being removably attachable to the first and second supports and having mounting ends engageable with the part to support the part from the first support or the second support, the base being displaceable with the wheels to enter and exit the NDT machine, displacement of the cart being prevented upon being within the NDT machine to secure the cart in position.

There is disclosed a method for non-destructively testing a part, the method comprising: displacing the part removably mounted to a cart into a testing enclosure of a non-destructive testing (NDT) machine; preventing displacement of the cart temporarily to secure the part in position within the testing enclosure; operating the NDT machine to perform non-destructive testing of the part; and displacing the part by displacing the cart away from the testing enclosure.

There is disclosed a weighing system, comprising: a support, a load cell mounted to the support, and a part platform suspended from the load cell to receive a part to be weighed, the load cell operable to generate thousands of weight values for the part per second over a period of less than twenty seconds, the load cell operable to output a weight of the part by averaging the weight values over the period of less than twenty seconds.

There is disclosed a method of weighing a part suspended from a load cell, the method comprising: generating thousands of weight values for the part per second with the load cell over a period of less than twenty seconds; averaging the weight values over the period of less than twenty seconds to generate a weight of the part; and outputting the weight of the part.

There is disclosed a computer-implemented method for performing a validation process on a part to be processed. An identifier associated with the part is received. A listing of at least one automated process is displayed based on the identifier. An indication of a selected automated process from the listing is received. First instructions are transmitted to an automated process device for performing an automated processing program in accordance with the selected automated process. Processing results associated with the part are received from the automated process device. Second instructions are transmitted to a validation process device for performing a validation program in accordance with a validation process associated with the selected automated process. Validation results associated with the part are received from the validation process device. The processing results and the validation results are stored in association with the identifier.

There is disclosed a system performing a validation process on a part to be processed. The system comprises a processing unit and a non-transitory computer-readable medium communicatively coupled to the processing unit. The computer-readable memory comprises computer-readable program instruction which are executable by the processing unit for: receiving an identifier associated with the part; displaying a listing of at least one automated process based on the identifier; receiving an indication of a selected automated process from the listing; transmitting first instructions to an automated process device for performing an automated processing program in accordance with the selected automated process; receiving processing results associated with the part from the automated processing system; transmitting second instructions to a validation process device for performing a validation program in accordance with a validation process associated with the selected automated process; receiving validation results associated with the part from the validation process device; and storing the processing results and the validation results in the non-transitory memory in association with the identifier.

DESCRIPTION OF THE DRAWINGS

Reference is now made to the accompanying figures in which:

FIG. 1 is a perspective view of a non-destructive testing (NDT) machine according to one possible embodiment;

FIG. 2C is a perspective view of another cart and another access platform of the NDT machine of FIG. 1;

FIG. 16 is a schematic view of a weighing system;

DETAILED DESCRIPTION

Figure 2A:
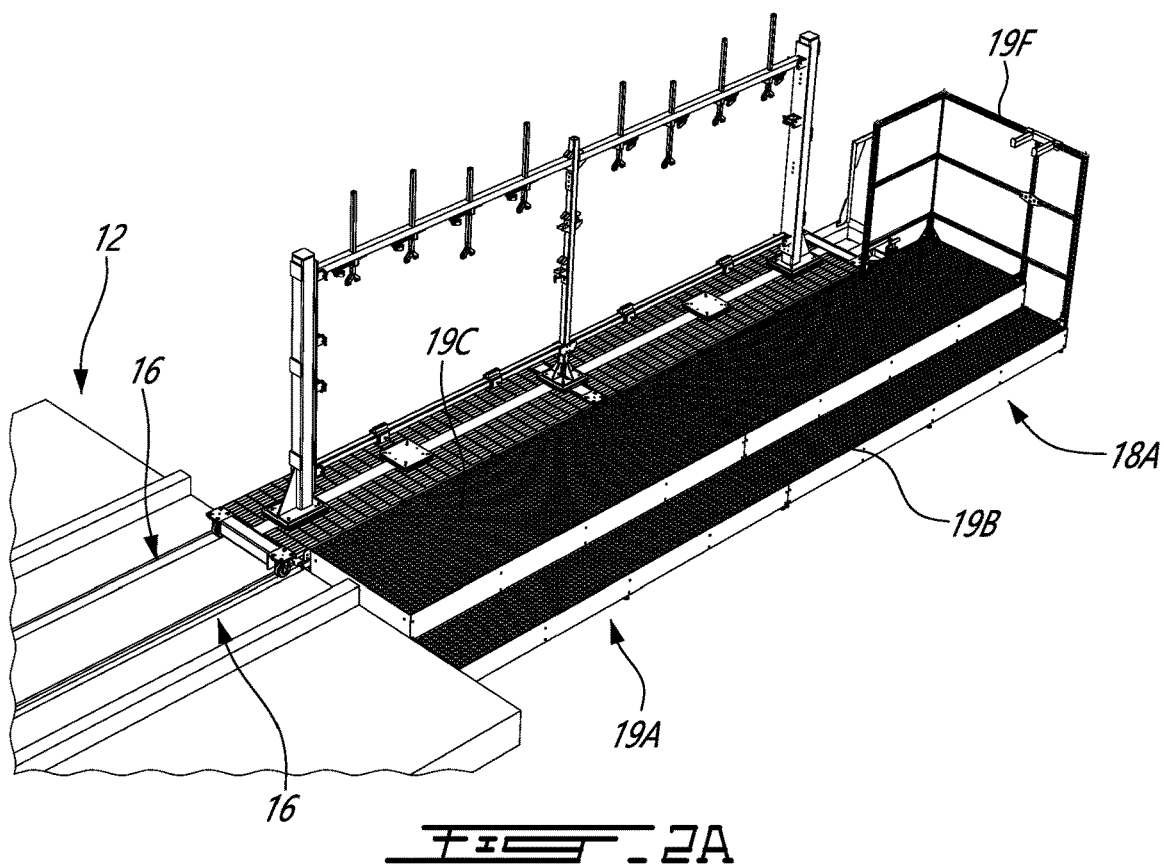
FIG. 2A is a perspective view of a cart and an access platform of the NDT machine of FIG. 1.

FIG. 1 illustrates a non-destructive testing machine 10 used to analyse the properties of a part 11 (see FIG. 7A) without causing damage to the part 11. In aerospace applications, for example, the non-destructive testing machine 10 may be used to determine whether a defect or discontinuity, such as a cavity or a tear, is present within the interior of the part 11. The non-destructive testing (NDT) machine 10 (sometimes referred to herein as the "NDT machine 10") may also be used to examine, inspect, and evaluate the part 11 without causing it damage. Therefore, the use herein of the term "testing" or the acronym "NDT" does not limit the machine 10 to being used only for testing purposes. Similarly, the part 11 may be any object requiring analysis within the NDT machine 10. The part 11 may be of any suitable size and shape that can be used within the NDT machine 10, as shown in the figures of the present disclosure. The part 11 may be made from a composite material, a metallic material, or any other suitable material or combination of materials.

The NDT machine 10 has a body 12 which defines and delimits and interior of the NDT machine 10 referred to herein as an enclosure 12A. The enclosure 12A is a volume of the NDT machine 10 which is sized to receive parts 11 of various sizes and shapes for analysis by the NDT machine 10. The enclosure 12A may thus be referred to as a testing enclosure 12A. The body 12 may have any suitable shape to define the enclosure 12A. In the configuration of FIG. 1, the body 12 has upright walls 12B extending upwardly from a base 12C which defines a floor of the NDT machine 10. The enclosure 12A may also have an upper bound defined by a ceiling of the body 12. The walls 12B may be partially or fully see-through to allow viewing of the part 11 within the enclosure 12A. The walls 12B may be rigid or flexible. The walls 12B may have one or more openings therein, closeable or not by a door, to allow for entry into the enclosure 12A and exit therefrom.

Referring to FIG. 1, the NDT machine 10 has non-destructive testing equipment 14. The NDT equipment 14 includes any item used to perform the analysis of the part 11, to process the data from the analysis of the part 11, and to display or output the results of the data processing, to name just a few of the possible functions of the NDT equipment 14. For example, the NDT machine 10 in FIG. 1 uses ultrasonic imaging with water as a medium, whereby sound waves travel through the water and penetrate the part 11 to provide information about its interior. For such a configuration of the NDT machine 10, the NDT equipment 14 includes water jet or squirter scanners 14A mounted to arms that displace within the enclosure 12A. The NDT equipment 14 also includes a hose 14B to supply the water to the squirter scanners 14A, ultrasound emitters, suitable sensors to capture the sound waves after they have passed through the part 11, computers or processors to analyse the data, and outputs such as monitors to display a technical image of the part 11 that an inspector can analyze to qualify the part 11. More, less or different NDT equipment 14 may also be used. An example of a system using ultrasonic imaging with water as a medium is the Ultrasonic Gantry System commercialised by TecScan of Boucherville, Québec, Canada.

Figure 3B:
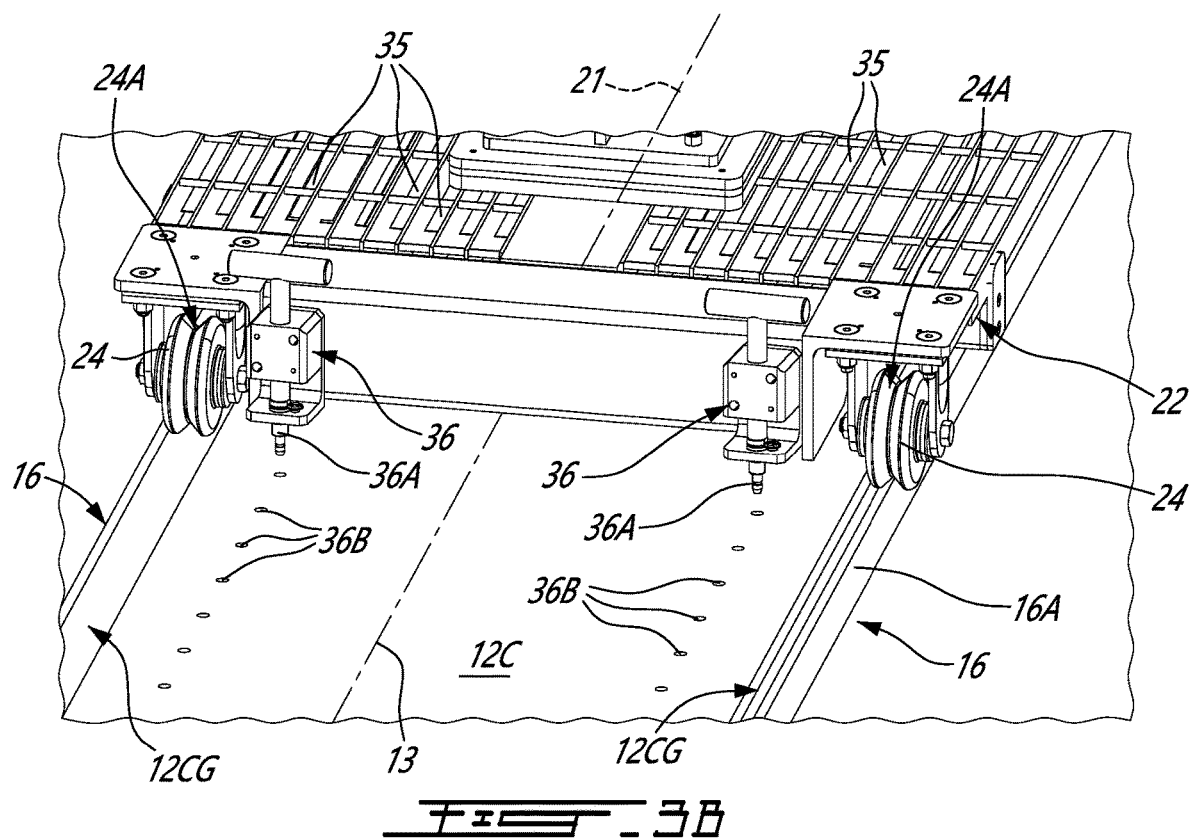
FIG. 3B is an enlarged view of the highlighted region in FIG. 3A.
Figure 3A:
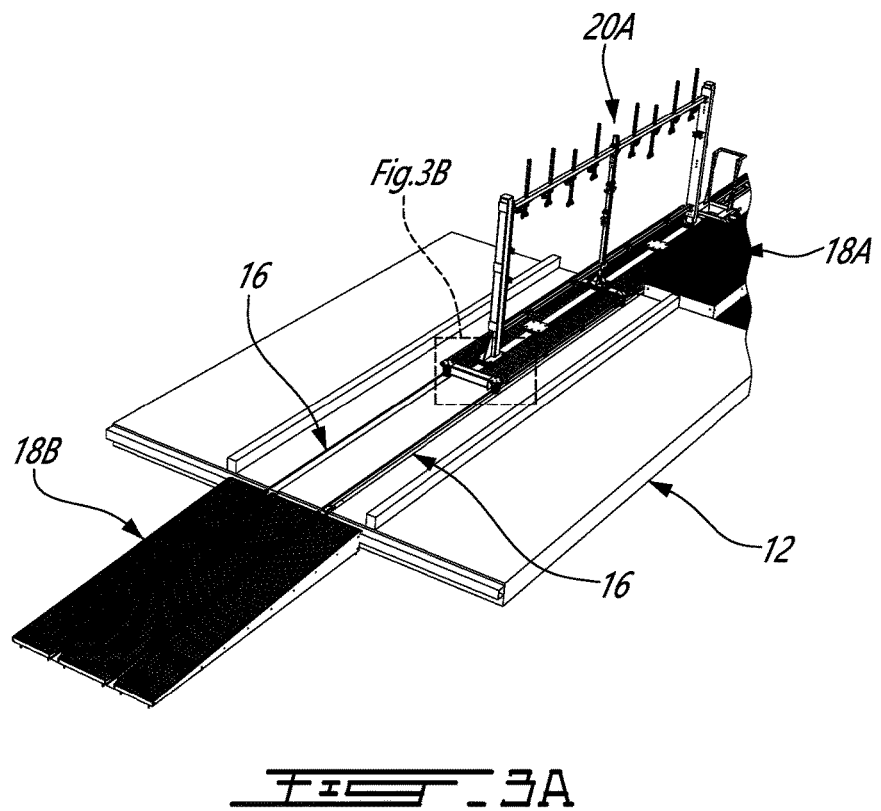
FIG. 3A is another perspective view of the NDT machine of FIG. 1.

Referring to FIG. 1, the NDT machine 10 has guide rails 16. The guide rails 16 are any suitable track, bar, groove or other object which extend along the base 12C of the body 12 to define a travel path for the part 11 within the enclosure 12A. In FIG. 1, the travel path defined by the guide rails 16 is a linear path where movement is allowed only in direction D1 and in direction D2 which is opposite to the direction D1. The guide rails 16 in FIG. 1 thus define a single and reversible travel path for the part 11 into and out of the enclosure 12A. The guide rails 16 thus limit the travel path for the part 11 within the enclosure 12A, and thus help to precisely position the part 11 within the enclosure 12A for testing. In FIG. 1, the guide rails 16 extend along a longitudinal axis 13 of the body 12. In an alternate embodiment, the guide rails 16 extend along the shorter axis of the body 12. In FIG. 1, the guide rails 16 extend from one longitudinal end of the base 12C to the other longitudinal end. One possible configuration for the guide rails 16 is shown in FIGS. 3A and 3B, where one of the guide rail 16 includes a bar 16A laid down into a groove 12CG in the base 12C, while the other guide rail 16 is another parallel groove 12CG in the base 12C. The bar 16A is made from metal in the depicted embodiment, but it may be made from other materials as well. Both the bar 16A and the grooves 12CG extend from one end of the base 12C to the other. In an alternate embodiment, the guide rails 16 are objects raised from an upper surface of the base 12C. In an alternate embodiment, the guide rails 16 take the form of two grooves extending into the base 12C. Other configurations for the guide rails 16 are possible.

Referring to FIG. 1, the NDT machine 10 has one or more access platforms 18. The access platforms 18 are located outside the body 12. The access platforms 18 allow for displacing the part 11 to load it into the enclosure 12A, and for displacing the part 11 out of the enclosure 12A after it has been tested. In FIG. 1, the NDT machine 10 has a first access platform 18A and a second access platform 18B spaced at opposite longitudinal ends of the base 12C of the body 12. The first and second access platforms 18A,18B allow for loading and unloading the part 11 from two different sides of the NDT machine 10, and thus allow for access to the enclosure 12A from two different sides. More or fewer access platforms 18 may also be used. The access platforms 18 have access guide rails 18C which are aligned with the guide rails 16 of the body 12. The term "aligned" means that the part 11 is displaced without difficulty from the access guide rails 18C to the guide rails 16, and vice versa. This alignment may take different forms. For example, in FIG. 1, one end of the access guide rails 18C is coterminous or spaced immediately adjacent to one end of the guide rails 16. In FIG. 1, each access guide rail 18C is parallel to its corresponding guide rail 16. The access guide rails 18C may take any suitable form or be arranged in any suitable way, and the description of the guide rails 16 above applies mutatis mutandis to the access guide rails 18C.

Figure 2B:
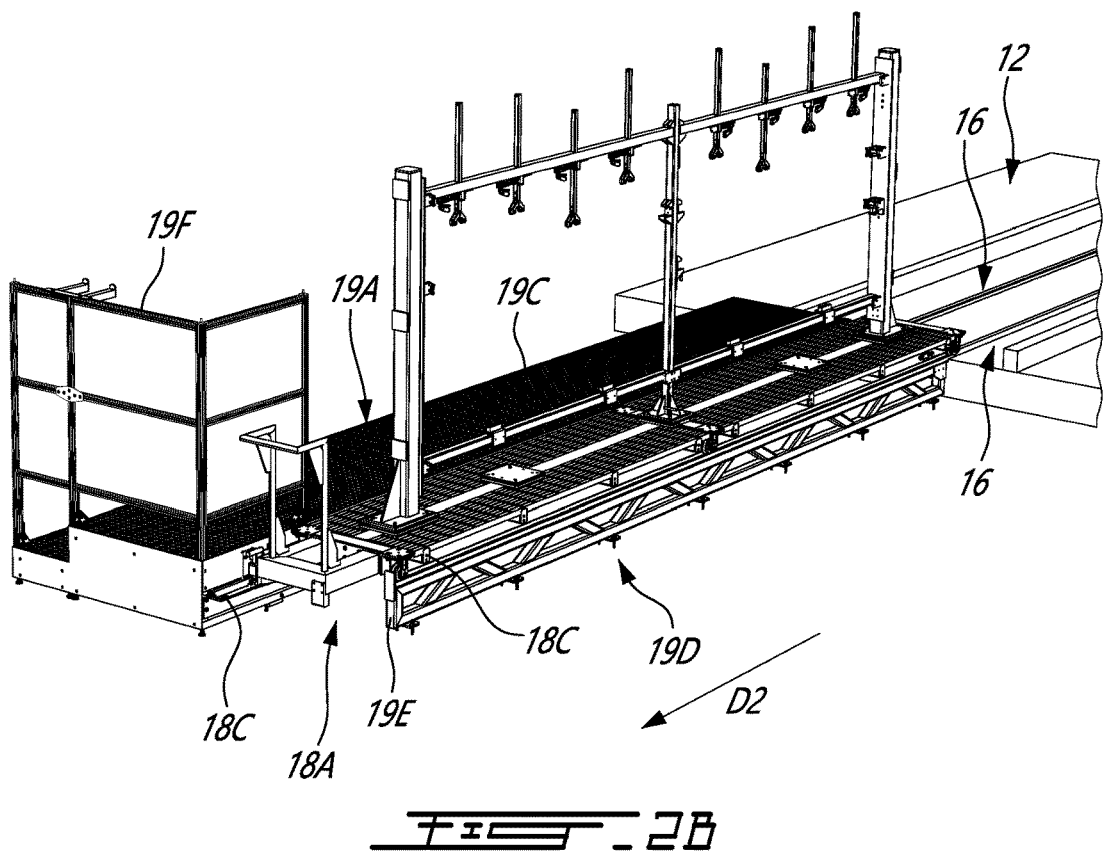
FIG. 2B is another perspective view of the cart and the access platform of FIG. 2A.

Referring to FIGS. 2A and 2B, the first access platform 18A includes an access base 19A. The access base 19A includes one or more steps 19B leading from the floor to an upper loading surface 19C. Referring to FIG. 2B, one of the access guide rails 18C of the first access platform 18A is mounted to the access base 19A, and the other access guide rail 18C is supported above the floor by a truss or framework 19D. One or both of the access guide rails 18C of the first access platform 18A has a stop or movement limiter 19E to prevent movement of the part 11 too far in the direction D2 away from the body 12. The first access platform 18A has a screen or barrier 19F at one of its ends opposite to the body 12 to prevent objects or people from falling from the upper loading surface 19C, and to protect against impacts caused by machines or people adjacent to the first access platform 18A. Referring to FIG. 2C, the second access platform 18B is in the form of a ramp that slopes upwardly from the floor to the plane of the base 12C of the body 12. One or both of the first and second access platforms 18A,18B may be displaceable to move them toward and away from the body 12.

Referring to FIG. 1, the NDT machine 10 includes one or more carts 20. The carts 20 are used to support one or more of the parts 11, and to displace them into the enclosure 12A of the body 12 for analysing by the NDT machine 10. One or more parts 11 may be mounted to one or more carts 20 outside of the body 12, and then displaced along the access guide rails 18C and the guide rails 16 into the enclosure 12A. The carts 20 may thus be any suitable trolley, dolly, wagon, carriage, or other moveable support for the part 11. FIG. 1 shows two different configurations of the cart 20A,20B. More configurations of the cart 20 are also possible.

Each cart 20 has a base 22 along a bottom of the cart 20. One or more wheels 24 are mounted to the base 22 to allow the cart 20 to be displaced. Each cart 20 has a first support 26 which extends upright from the base 22, and a second support 28 spaced apart from the first support 26 and which also extends upright from the base 22. The upright first and second supports 26,28 are used to support the part 11, directly or indirectly, so that it can be analyzed. In FIG. 1, the first and second supports 26,28 are fixedly attached to the base 22 and cannot be positioned elsewhere on the base 22. In FIG. 1, the first and second supports 26,28 are spaced apart from each other in a direction parallel to a longitudinal axis 21 of each cart 20.

In FIG. 1, the first and second supports 26,28 are located at opposite longitudinal ends of the base 22. The space or volume between the first and second supports 26,28 forms a testing window 25. One or more parts 11 are suspended or supported by the cart 20 within the testing window 25. When the part 11 is displaced with the cart 20 into the enclosure 12A, only the testing window 25 remains within the enclosure 12A. The first and second supports 26,28 remain outside the enclosure 12A so as to provide minimal obstruction to the NDT equipment 14 operating and/or moving within the enclosure 12A. Referring to FIG. 1, each cart 20 has mounting fixtures 29 which are removably attached or mounted to one or both of the first and second supports 26,28. Each mounting fixture 29 has one or more mounting ends 27 which engage the part 11 at a location thereon. The mounting fixtures 29 thus grasp, seize or hold the part 11 within the testing window 25, thereby allowing the first and/or second supports 26,28 to directly or indirectly support the part 11.

To insert the part 11 into the NDT machine 10, the wheels 24 of the base 22 are used to displace the cart 20 with its part 11 supported by mounting fixtures 29 along the guide rails 16 of the body 12 and along the access guide rails 18C of the access platforms 18 into the enclosure 12A. The same technique is performed in reverse to remove the part 11 from the enclosure 12A after it has been analyzed. When the cart 20 and the part 11 supported thereby are within the enclosure 12A, the wheels 24 or another part of the cart 20 are locked to prevent further displacement of the cart 20, and to secure the part 11 in the desired position within the enclosure 12A for analysis.

The cart 20 thus helps to provide a fixture to quickly mount the part 11 for testing and to quickly dismount the part 11 using the mounting fixtures 29. The restricted travel path of the cart 20 and part 11 along the guide rails 16 ensures that the part 11 is properly positioned within the NDT machine 10 for analysis by the NDT equipment 14. The ability to lock the wheels 24 and/or cart 20 in the NDT machine 10, or otherwise prevent further displacement of the cart 20 within the enclosure 12A, further contributes to securing the correct position for the part 11 to facilitate analysis.

For some conventional testing machines, it may be necessary to programme the machine for each part to be tested, a process which is time-consuming particularly when the machine is used to test many parts having complex geometries. The cart 20 disclosed herein helps to reduce the time needed to both set-up and program the machine. The mounting fixtures 29 help to quickly and reliably mount the part 11 to the cart 20 in the desired orientation, and the guide rails 16 with cooperating wheels 24 help to consistently position parts 11 within the machine. The ability to lock the part 11 in the desired position within the machine by preventing further displacement of the cart 20 also helps to standardise the set-up, such that similar parts 11 may be set up and programmed in repeatable ways. In helping to standardize the set-up of the part 11 and the programming of the machine, the cart 20 contributes to reducing the hours required to test the part 11.

Different configurations of the carts 20 are possible to achieve the functionality described above. Examples of some possible carts 20 are now described.

Figure 4A:
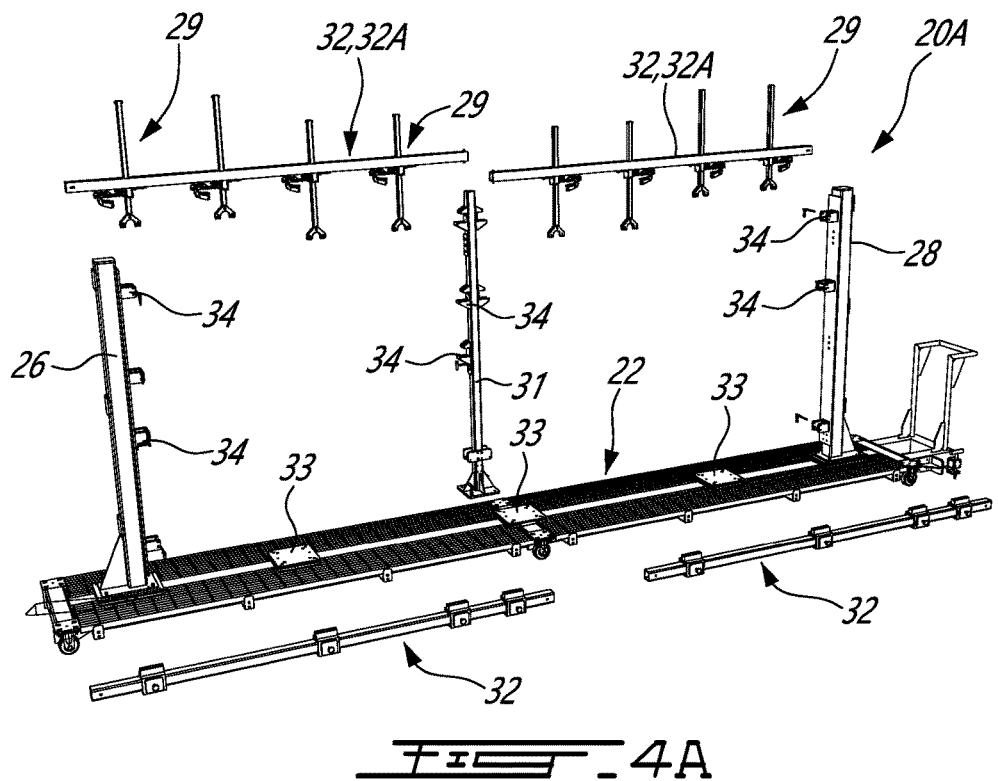
FIG. 4A is an exploded perspective view of the cart of FIG. 2A.
Figure 4B:
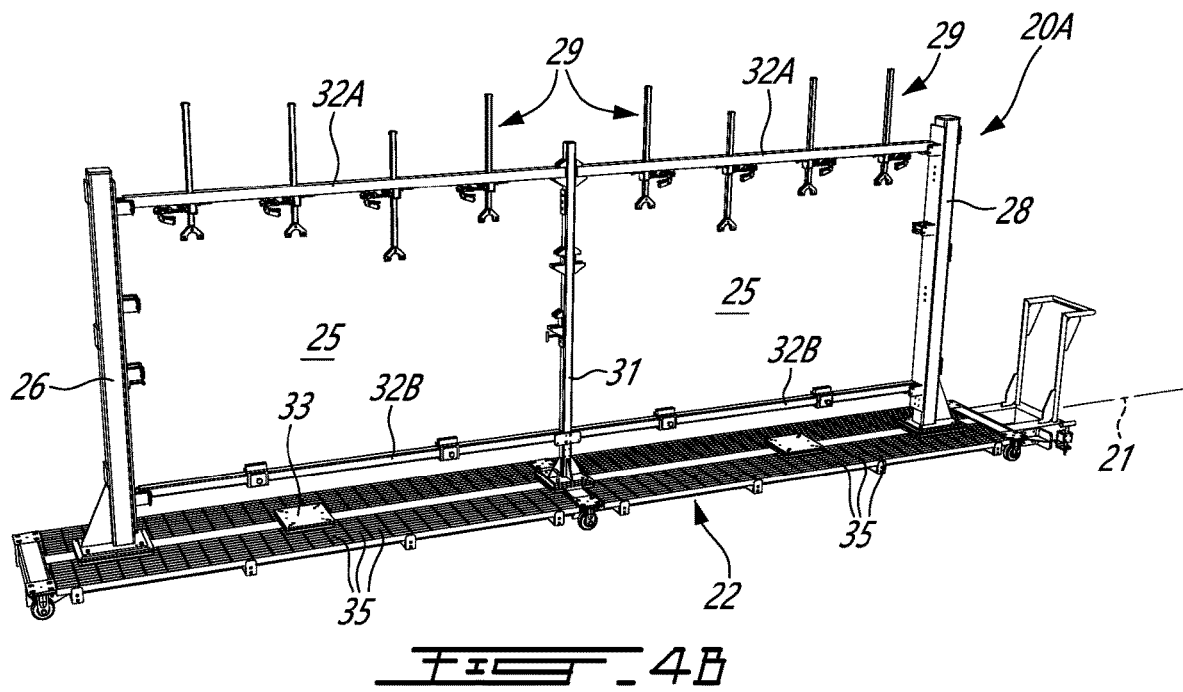
FIG. 4B is an assembled perspective view of the cart of FIG. 2A.

Referring to FIGS. 4A and 4B, the cart 20A may be used to support larger parts 11 for testing. The testing window 25 between the first and second supports 26,28 is thus large. Examples of such parts 11 are shown in FIGS. 10-13, where the cart 20A is used to support different parts 11 of an aircraft that have different, and in some cases, complex geometries. Referring to FIGS. 4A and 4B, in order for the cart 20A to support smaller parts 11, the testing window 25 may be divided by using one or more supplemental supports 31 extending upright from the base 22. The supplemental support 31 may be mounted to the base at specific, predetermined locations, such as those shown in FIGS. 4A and 4B covered with plaques 33. In an alternate embodiment, the supplemental support 31 may be displaceable along the base 22 to be positioned at any suitable location thereon. By reducing the size of the testing window 25, the supplemental support 31 helps to reduce the work required by a single person to mount smaller parts 11 to the cart 20A. This may provide occupational health and safety benefits.

Figure 5B:
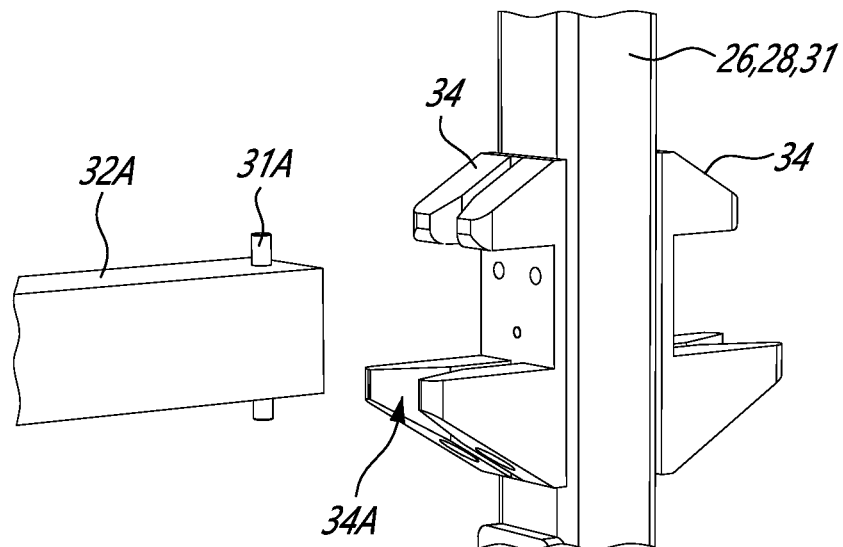
FIG. 5B is an enlarged disassembled view of the highlighted region in FIG. 5A.
Figure 5A:
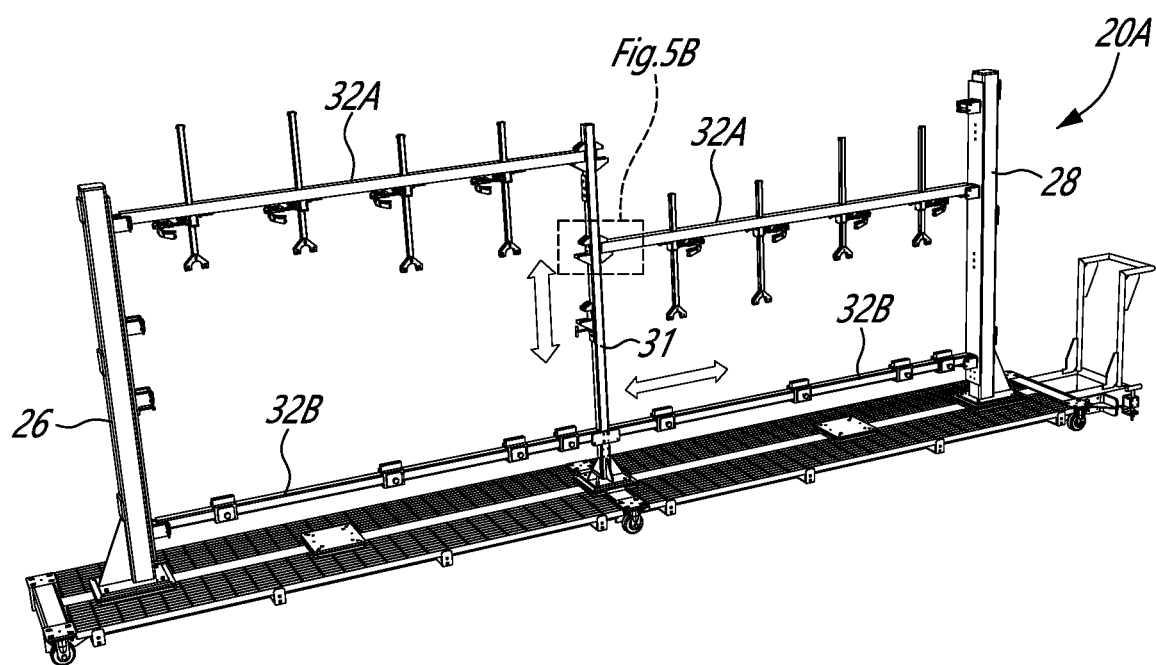
FIG. 5A is a perspective view of the cart of FIG. 2A having a different arrangement of components.

The cart 20A has horizontal supports 32. The horizontal supports 32 provide upper and/or lower bounds to the testing window 25, and provide additional anchoring points for the user when mounting the part 11 to the cart 20A. The horizontal supports 32 may thus contribute to occupational health and safety by permitting smaller and thus lighter mounting fixtures 29 to be used to mount parts 11 to the cart 20A. In FIGS. 4A and 4B, the horizontal supports 32 include an upper horizontal support 32A and a lower horizontal support 32B. Referring to FIG. 4B, the lower horizontal support 32B is configured to support most or all of the weight of the part 11, while the upper horizontal support 32A helps to position and retain the part 11 to prevent movement thereof. In FIGS. 4A and 4B, each of the upper and lower horizontal supports 32A,32B are shown extending between the supplemental support 31 and one of the first and second supports 26,28. In an alternate configuration, one or more of the horizontal supports 32 extends between the first and second supports 26,28. Each of the upright supports 26,28,31 have vertically-spaced apart mounts 34 to removably receive the horizontal supports 32, and/or to receive the mounting fixtures 29. Referring to FIGS. 5A and 5B, the upper horizontal supports 32A may be fixed at different vertical positions, and are thus vertically adjustable. The lower horizontal supports 32B may also be vertically adjustable. FIG. 5B shows one possible configuration of the mounts 34 on the upright supports 26,28,31. The mount 34 in FIG. 5B has a central slot 34A configured to receive a pin 31A at one end of the upper horizontal support 32A.

Referring to FIGS. 4A and 4B, the base 22 of the cart 20A has multiple drainage apertures 35 (see FIG. 3B as well). In the configuration where the NDT machine 10 uses water to perform the analysis of the part 11, the drainage apertures 35 allow water within the enclosure 12A to drain away from the base 22 and the cart 20A. The first, second and supplemental supports 26,28,31 are spaced apart from each other in a direction parallel to the longitudinal axis 21 of the cart 20A, and are aligned along the axis 21. When the cart 20A is within the enclosure 12A, the axis 21 of the cart 20A is parallel to the longitudinal axis 13 of the body 12. When the cart 20A is within the enclosure 12A, the axis 21 of the cart 20A is above and aligned with the longitudinal axis 13 of the body 12. When the cart 20A is within the enclosure 12A, the axis 21 of the cart 20A is parallel to the guide rails 16 of the body 12.

Referring to FIG. 3B, the wheels 24 of the cart 20A are mounted to an underside of the base 22. The wheels 24 have a central groove 24A configured to mate with the correspondingly-shaped bar 16A laid down into the groove 12CG in the base 12C. In FIG. 3B, the bar 16A has a cross-sectional shape defined in a plane that is perpendicular to the longitudinal axis of the bar 16A. The cross-sectional shape of the bar 16A is triangular, with an apex of the triangular cross-sectional shape being spaced furthest from the groove 12CG. The other guide rail 16 in FIG. 3B is another parallel groove 12CG in the base 12C that receives the other V-shaped wheel 24, and has a flat bottom.

In FIG. 3B, the central groove 24A of the wheels 24 has a "V" shape. The cross-sectional shape of the bar 16A is thus convex in relation to the concave V-shaped central groove 24A. When the V-shaped central groove 24A of one of the wheels 24 is mated or engaged with the correspondingly-shaped and convex bar 16A, lateral movement of the cart 20A within the enclosure 12A (i.e. movement in a direction transverse to the axis 21 of the cart 20A) is limited. The other wheel 24 within the parallel groove 12CG in the base 12C allows for some lateral movement before the wheels 24 and/or the cart 20A are locked, but this movement is limited because of the mating engagement of the other wheel 24 with the bar 16A. The central grooves 24A and the bar 16A may have other commentary shapes to achieve the functionality described above.

Referring to FIG. 3B, one or both of the wheels 24 of the cart 20A has a locking mechanism 36. The locking mechanism 36 selectively lockable. When the locking mechanism is actuated to prevent further rotation of the wheels 24, it also locks the cart 20A and the mounted part 11 in the desired position within the enclosure 12A. In FIG. 3B, the locking mechanism 36 includes a push pin 36A insertable into one of multiple slots or openings 36B in the base 12C of the body 12. In FIG. 3B, the locking mechanism 36 is selectively lockable with the base 12C of the body 12.

Figure 14A:
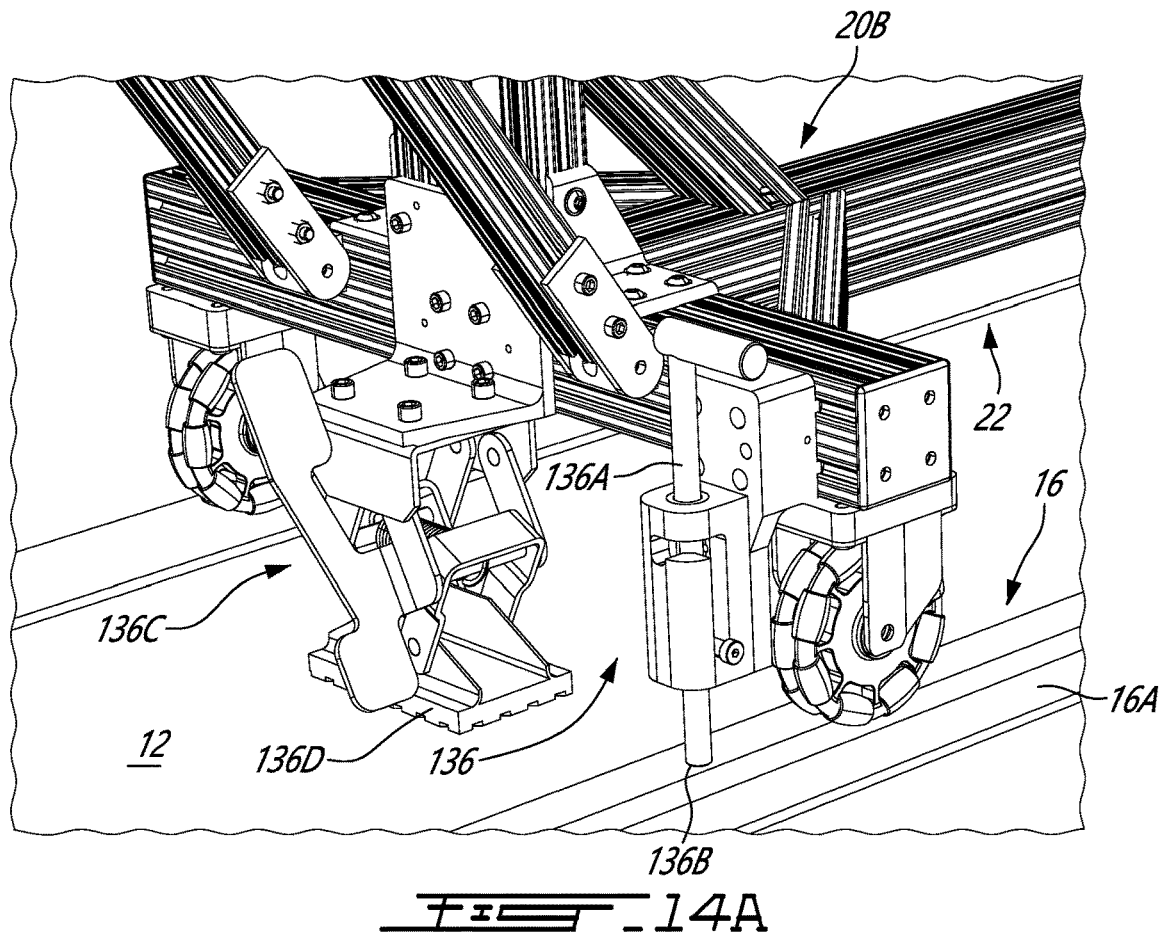
FIG. 14A is an enlarged view of part of the cart of FIG. 2C.
Figure 14B:
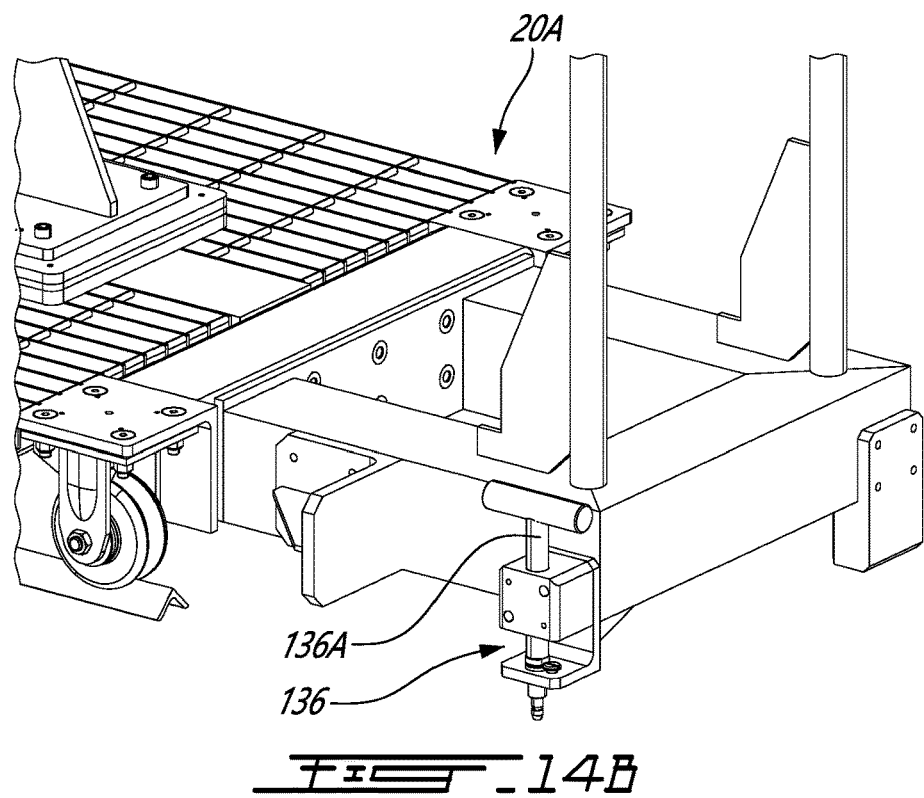
FIG. 14B is an enlarged view of part of the cart of FIG. 2A.

Other configurations for the locking mechanism 36 are possible. Another example of a locking mechanism 136 is shown in FIG. 14A. The locking mechanism 136 is mounted to the base 22 of the cart 20B, and includes a push pin 136A insertable into one of multiple slots or openings 136B in or along one of the guide rail 16s of the body 12 of the NDT machine 10, so as to lock the cart 20B in the correct and desired position within the enclosure 12A. The cart 20B in FIG. 14A has a brake 136C with an actionable brake pad 136D mounted to the base 22. The brake pad 136D engages a floor surface to stop movement of the cart 20B. In FIG. 14A, the brake pad 136D is meant to be used outside of the enclosure 12A to avoid movement of the cart 20B while a part 11 is being mounted thereto. FIG. 14B shows another variant of the locking mechanism 136 with the push pin 136A mounted to the handle of the cart 20A.

Figure 6B:
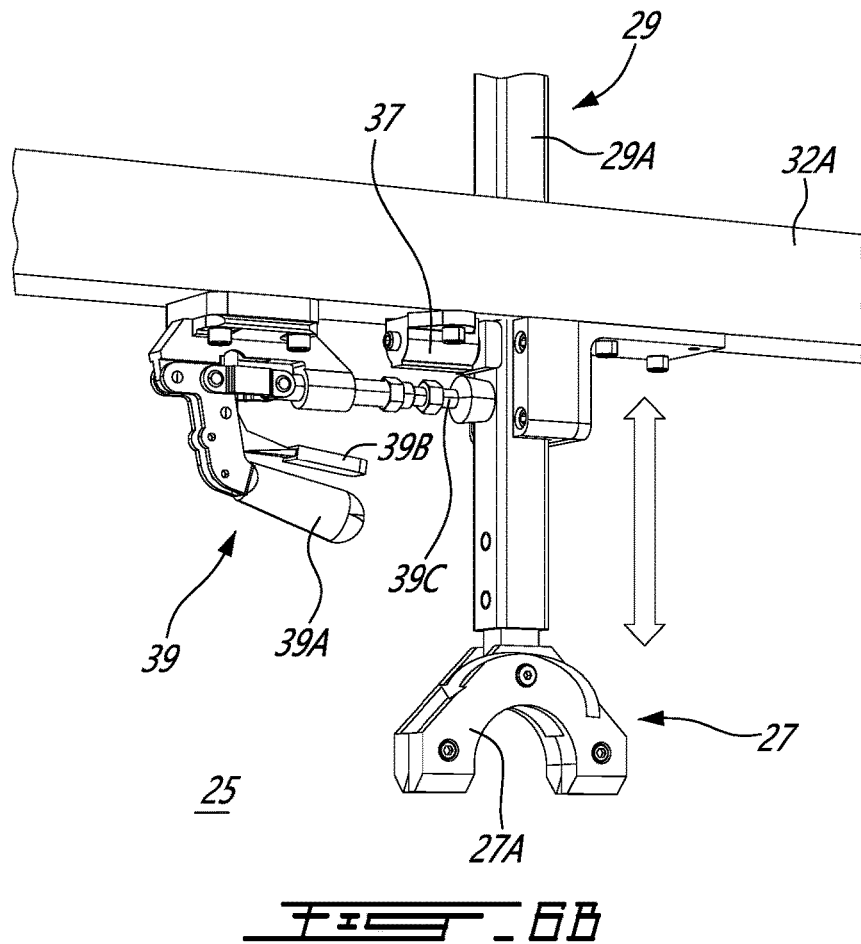
FIG. 6B is an enlarged view of the highlighted region in FIG. 6A.
Figure 6A:
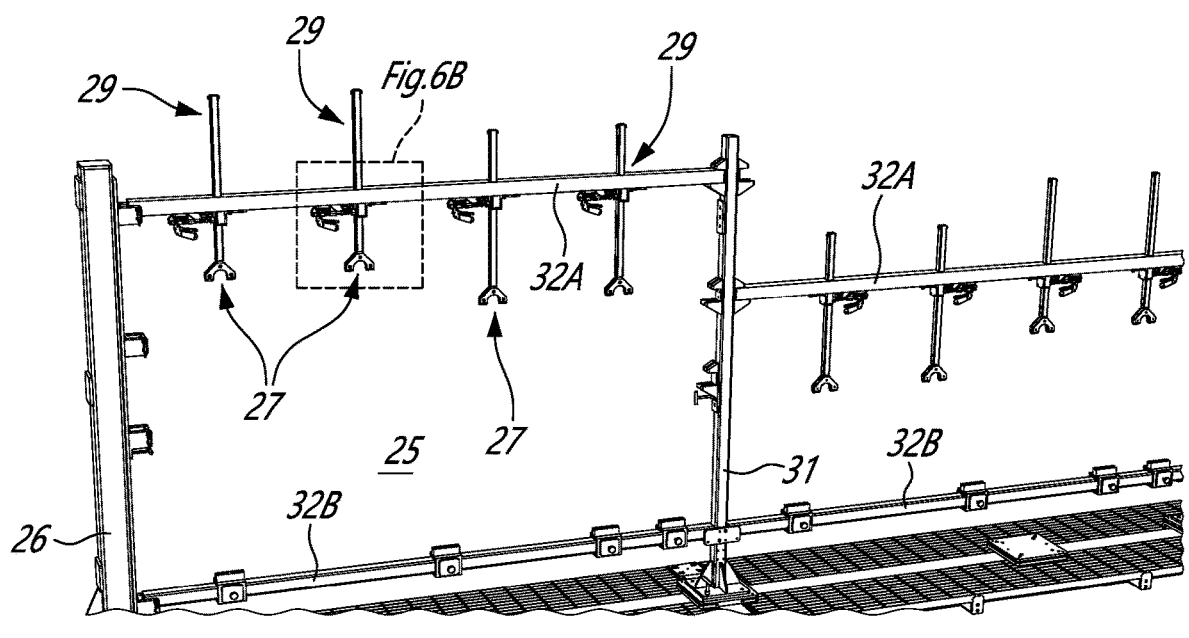
FIG. 6A is another perspective view of the cart of FIG. 2A.

An example of a possible configuration of the mounting fixtures 29 is shown in FIGS. 6A and 6B. The mounting fixtures 29 are removably mounted to the upper horizontal support 32A through apertures therein. The mounting fixtures 29 are adjustable vertically, such that the mounting ends 27 can be moved vertically into and out of the testing window 25. Each mounting fixture 29 includes a rod 29A, and the mounting end 27 is a clamp 27A positioned at a lower end of the rod 29A. The rod 29A can be displaced vertically relative to the upper horizontal support 32A to adjust a height of the clamp 27A. The clamp 27A is thus a vertically and horizontal sliding clamp 27A. The clamp 27A is pivotable about a pivot axis defined at its connection to the rod 29A. The clamp 27A may be pivoted by the part 11 itself when the part 11 is mounted to the clamp 27A, so that the clamp 27A and the mounting fixture 29 adjusts passively to the orientation of the part 11 at that location. A height-fixation mechanism is fixedly mounted to the upper horizontal support 32A to engage and disengage the rod 29A in order to fix its position relative to the upper horizontal support 32A, and thus to fix the height of the clamp 27A. The example of the height-fixation mechanism 39 shown in FIGS. 6A and 6B includes a handle 39A and lever 39B to displace a lock bolt 39C toward or away from the rod 29A. The lock bolt 39C may frictionally engage a surface of the rod 29A to arrest its movement, or it may insert within an aperture of the rod 29A to arrest a movement of the rod 29A. A locking mechanism 37 is provided for redundancy purposes, to prevent the rod 29A from falling down in the event the user forgets to properly engage the height-fixation mechanism 39 with the rod 29A. The example of the locking mechanism 37 shown in FIGS. 6A and 6B includes a lock spring.

Figure 7B:
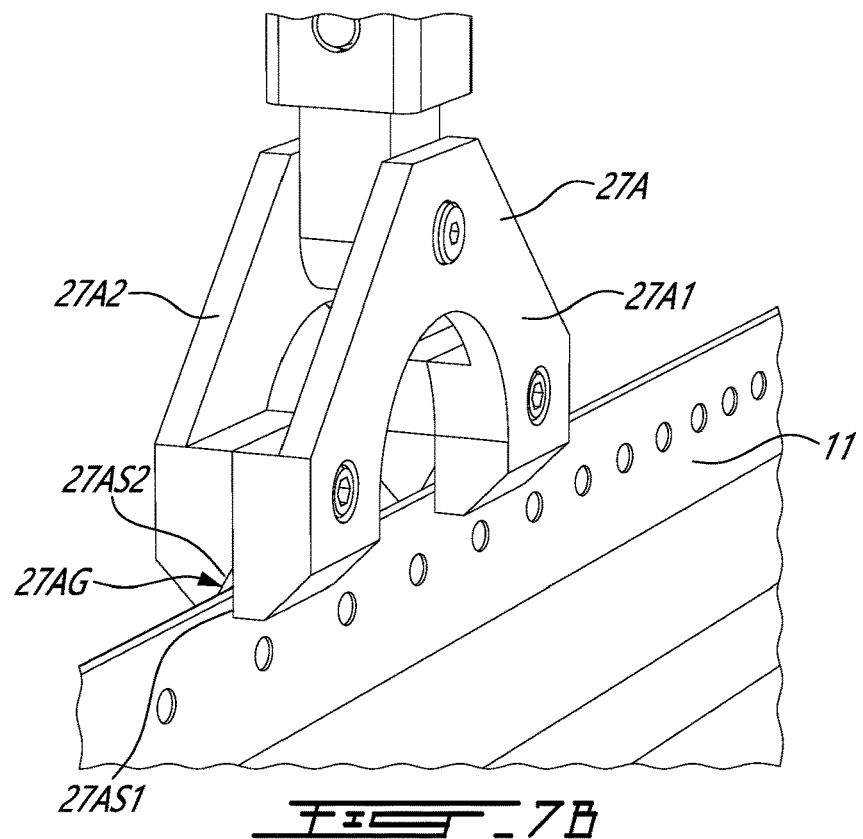
FIG. 7B is an enlarged view of the highlighted region in FIG. 7A.
Figure 7A:
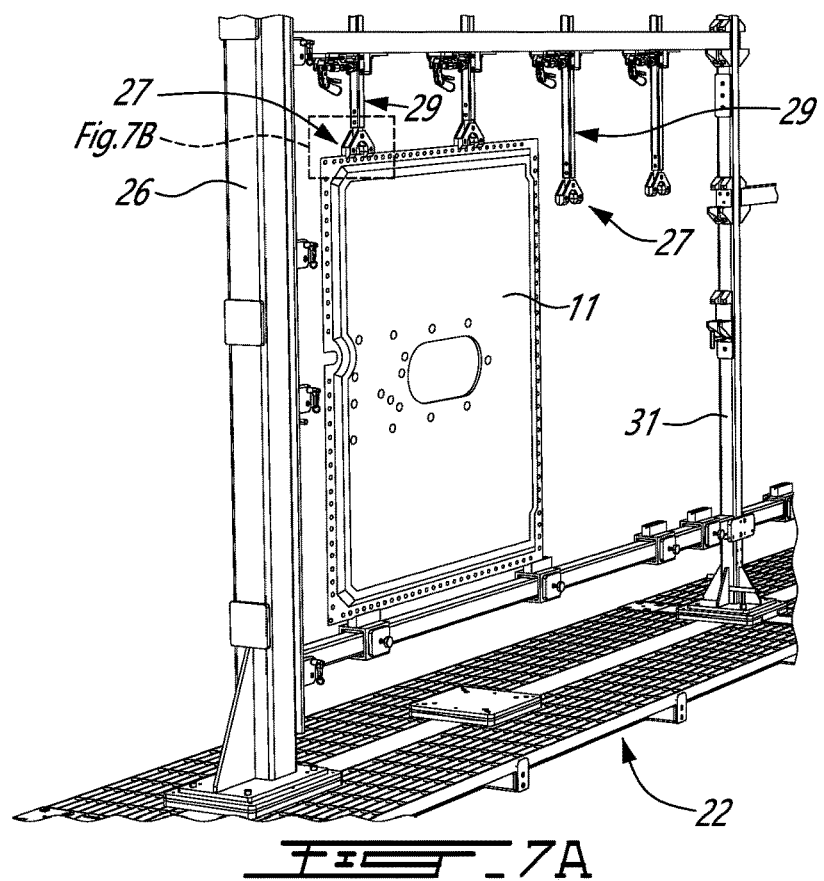
FIG. 7A is another perspective view of the cart of FIG. 2A.

Referring to FIGS. 7A and 7B, one of the clamps 27A is shown engaged to a portion of the part 11. Referring to FIG. 7B, the clamp 27A includes a first clamp arm 27A1 and a second clamp arm 27A2. The first clamp arm 27A1 has a first clamping surface 27AS1 that engages the part 11, and is flat. The second clamp arm 27A2 has a second clamping surface 27AS2 which engages the part 11 from the other side. The second clamping surface 27AS2 is flat along some of its extent, and then forms an outward angle toward the distal end of the second clamp arm 27A2 to create a gap 27AG into which the portion of the part 11 is inserted. This shape of the first and second clamping surfaces 27AS1, 27AS2 allows better positioning of the part 11. When the clamp 27A is lowered toward the part 11 or when the part 11 is raised toward the clamp 27A, the angled portion of the second clamping surface 27AS2 pushes the part 11 toward the flat first clamping surface 27AS1.

Figure 8B:
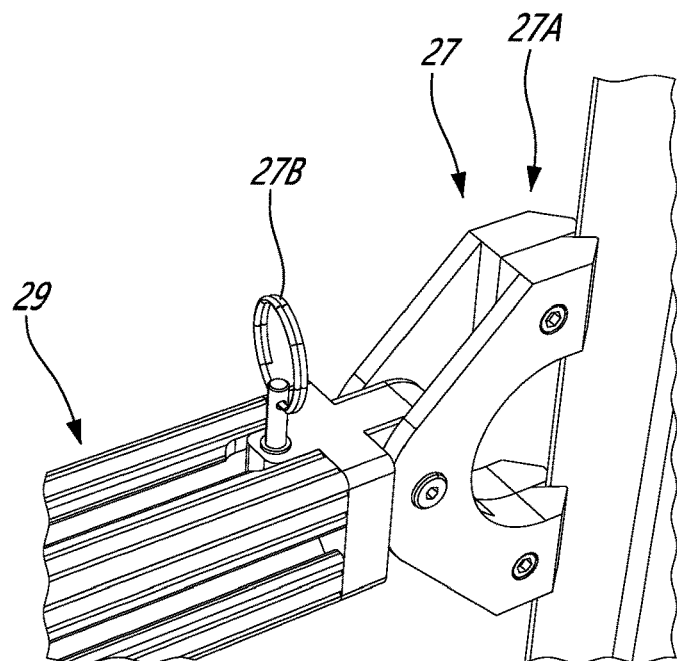
FIG. 8B is an enlarged view of the highlighted region in FIG. 8A.
Figure 8A:
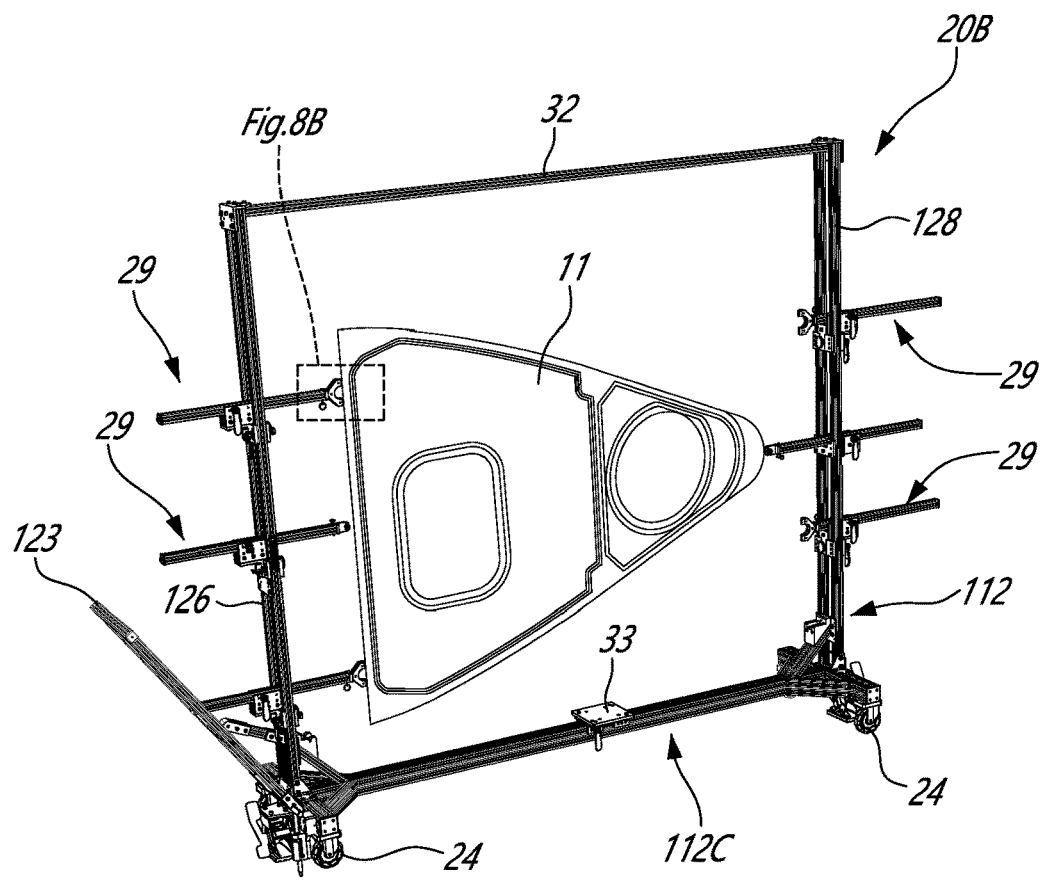
FIG. 8A is another perspective view of the cart of FIG. 2C.

FIGS. 8A and 8B show another possible configuration of the cart 20B. The cart 20B may be used to support parts 11 which are smaller in size than those supported on the cart 20A. The cart 20B may be used as a secondary cart, which is loaded with one or more parts 11 while the part 11 supported by the cart 20A is within the enclosure 12A undergoing analysis. The cart 20B therefore allows for preparing another part 11 for analysis in anticipation of when the part 11 supported by the cart 20A is finished its analysis. The cart 20A may enter and exit the enclosure 12A using the second access platform 18B in the form of a ramp, as shown in FIG. 1. The base 112C of the body 112 of the cart 20B is an elongated support bar or beam. The base 112C has one or more plaques 33 covering locations on which one or more supplemental supports 31 may be mounted to the base 112C. The first and second supports 126,128 of the cart 20B are vertical bars forming a framework. A handle 123 is mounted to the one of the first and second supports 126,128 to assist in displacing the cart 20B. The cart 20B may have or use wheels 24, supplemental supports 31, horizontal supports 32, mounting fixtures 29, and any other feature of the cart 20A described above. Therefore, the description provided above of these features, their function and their components applies mutatis mutandis to the cart 20B.

Figure 9B:
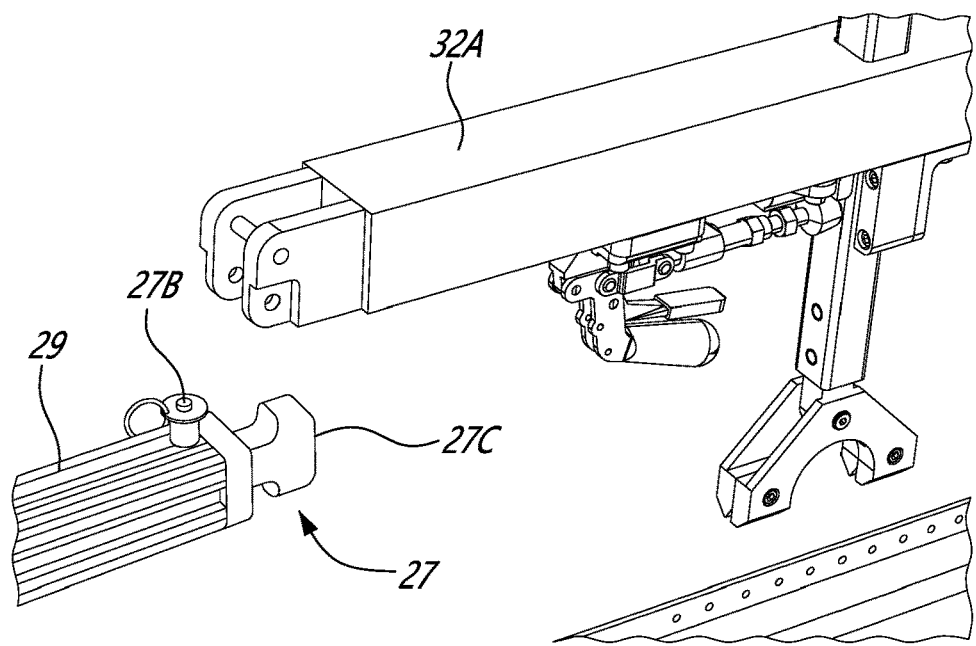
FIG. 9B is an enlarged view of the highlighted region in FIG. 9A.
Figure 9A:
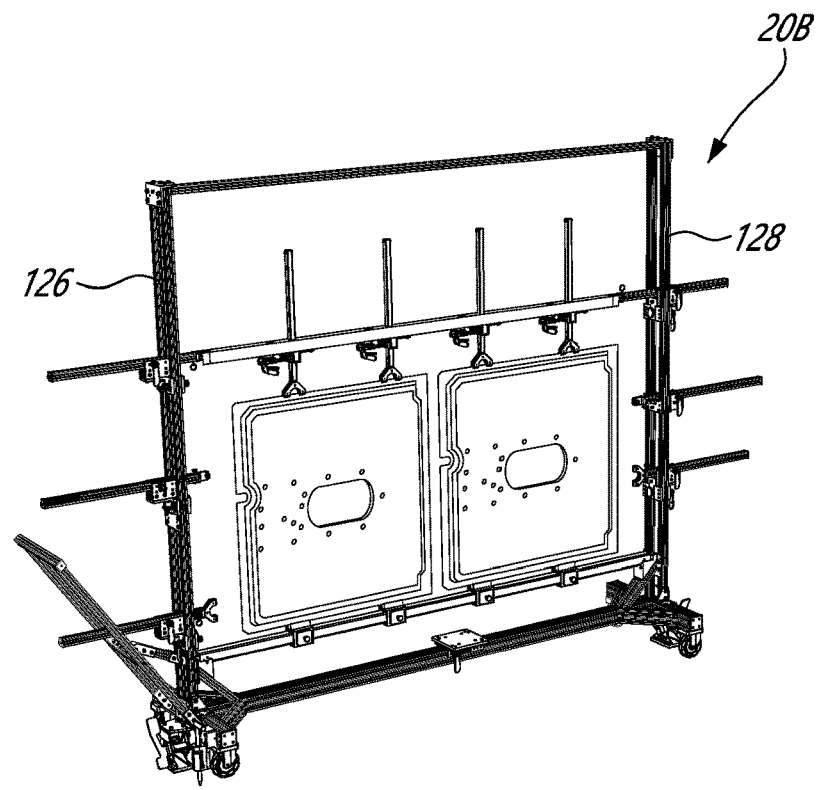
FIG. 9A is another perspective view of the cart of FIG. 2C.
Figure 10:
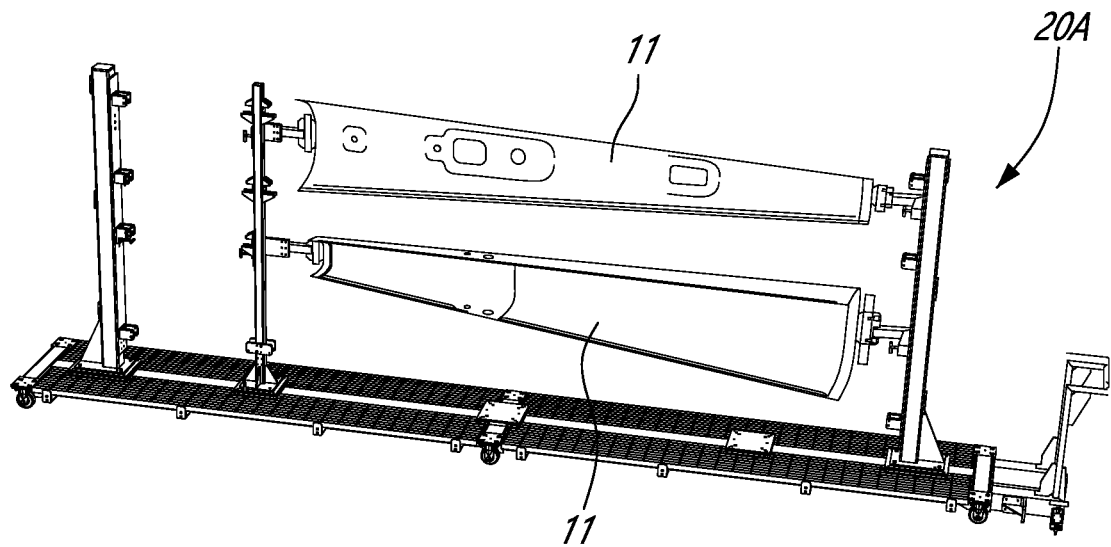
FIG. 10 is a perspective view of the cart of FIG. 2A having another arrangement of components.
Figure 11:
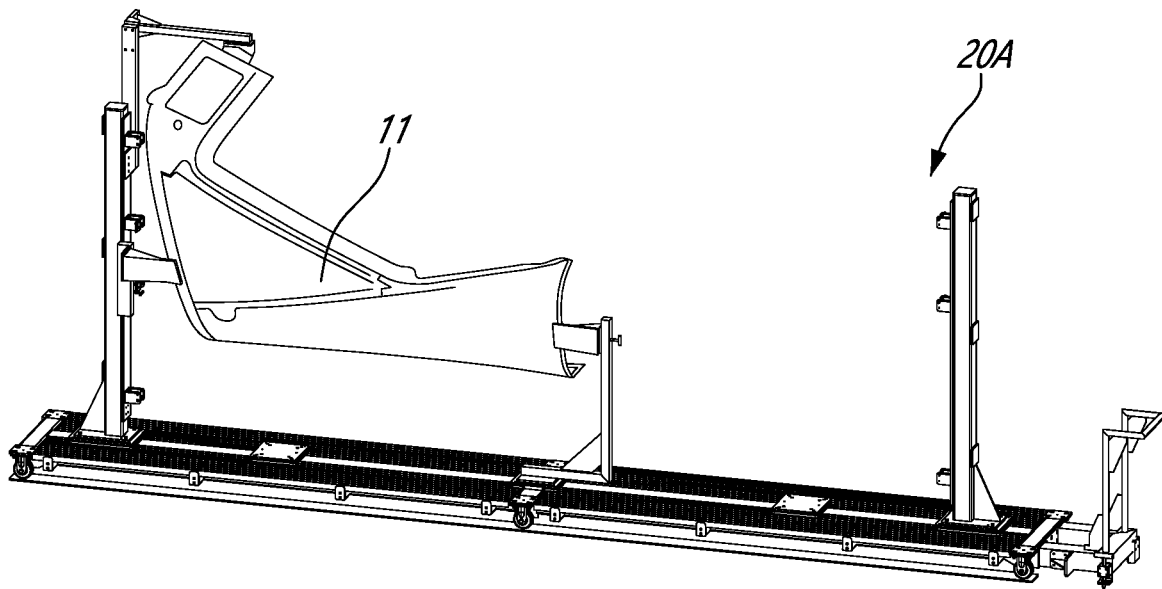
FIG. 11 is a perspective view of the cart of FIG. 2A having another arrangement of components.
Figure 12:
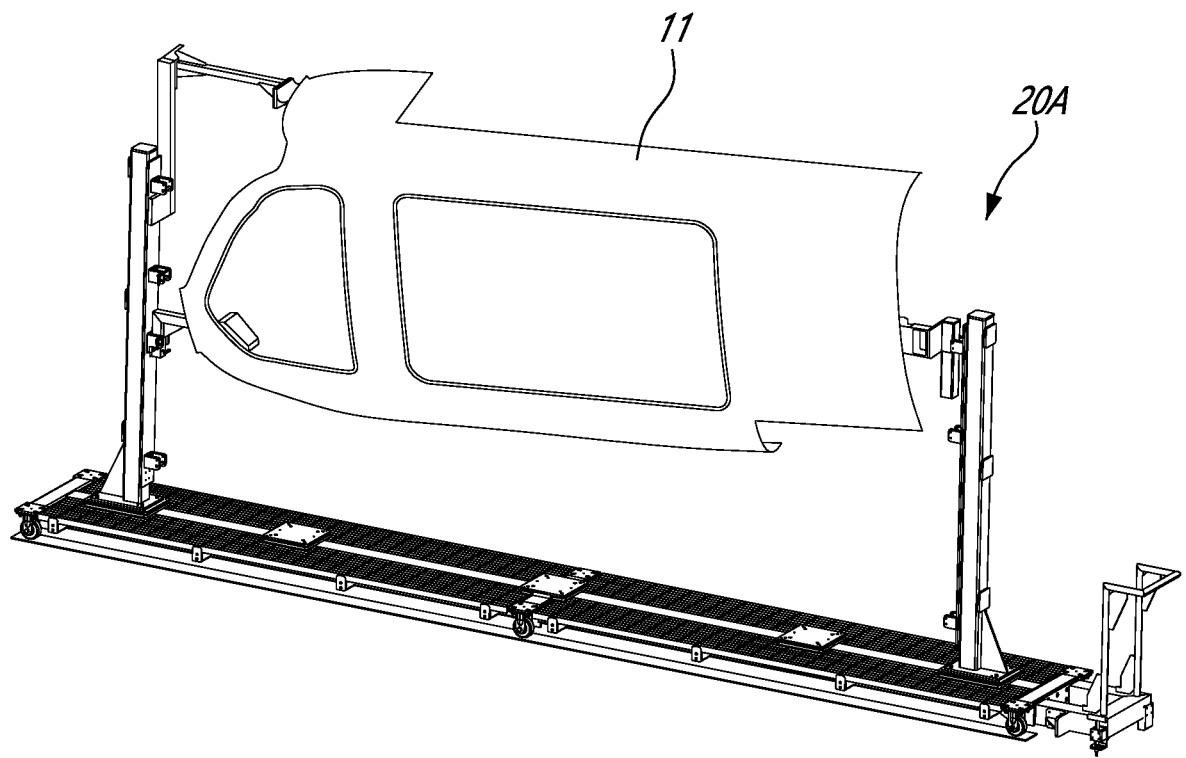
FIG. 12 is a perspective view of the cart of FIG. 2A having another arrangement of components.
Figure 13:
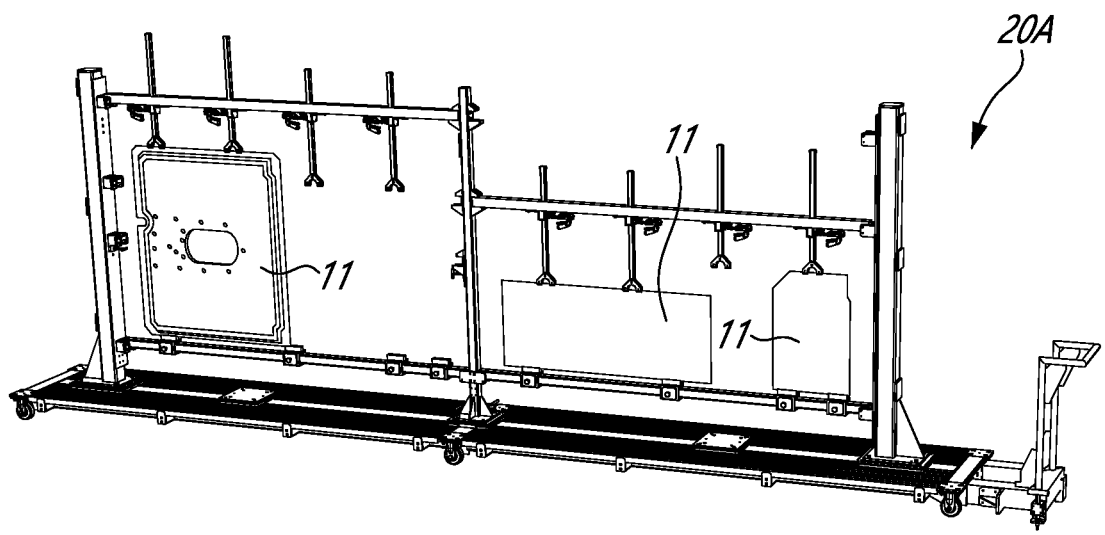
FIG. 13 is a perspective view of the cart of FIG. 2A having another arrangement of components.

Referring to FIGS. 8A and 8B, the mounting fixtures 29 are removably mounted to the first and second supports 126,128 of the cart 20B. One more of the mounting fixtures 29 are displaceable relative to the first and second supports 126,128 in both the vertical and horizontal directions. This allows the mounting fixtures 29 to be very precisely positioned to engage the part 11. One or more of the mounting fixtures 29 may be in a fixed vertical position on the first or second supports 126,128 such that it is only allowed to horizontally displace. Such a mounting fixture 29 may be used to engage the tooling hole of the part 11. Referring to FIG. 8B, the mounting end 27 at the extremity of the mounting fixture 29 is removable from the mounting fixture 29, so that another type of mounting end 27 may be used with the same mounting fixture 29. In FIG. 8B, a lock pin 27B is used to secure the clamp 27A to the end of the rod 29A. By removing the lock pin 27B, the clamp 27A may be removed from the rod 29A, and another type of mounting end 27 may be mounted to the rod 29A. Another example of the interchangeability of the mounting ends 27 is shown in FIGS. 9A and 9B. In FIGS. 9A and 9B, the clamp 27A has been removed from the rod 29A, and a mounting lug 27C has been secured to the end of the rod 29A with the lock pin 27B. The mounting lug 27C is used to engage one end of the upper horizontal support 32A so as to mount it to one of the supports 126,128 of the cart 20B. It will thus be appreciated that many different mounting ends 27 may be used for a single mounting fixture 29. A custom-designed mounting end 27, such as one produced to mate with a specific portion of the part 11, may be manufactured using any suitable technique, including additive manufacturing.

Figure 15A:
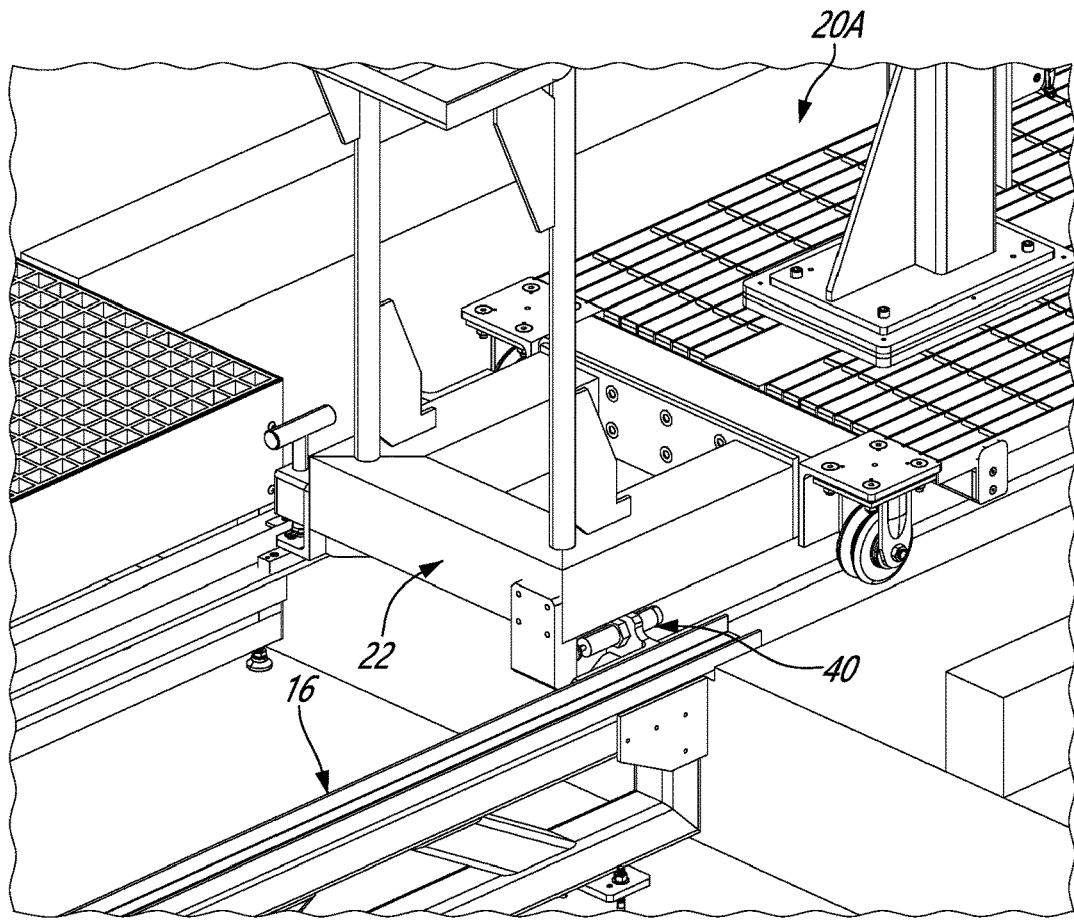
FIG. 15A is an enlarged view of part of the cart of FIG. 2A.
Figure 15B:
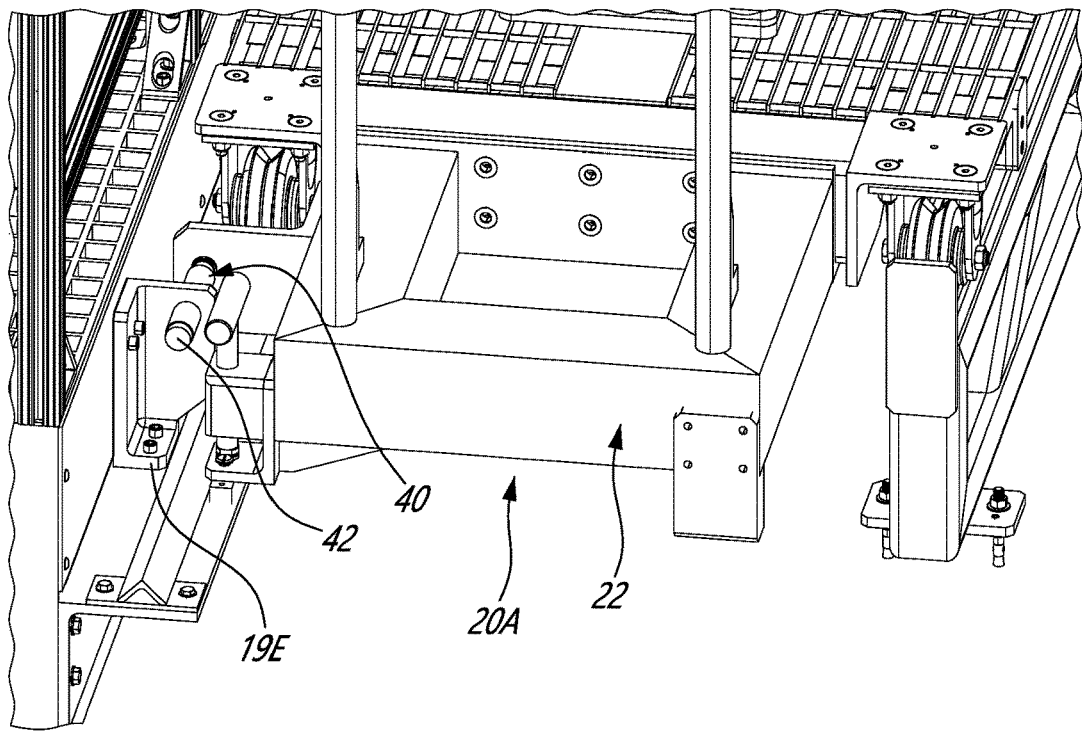
FIG. 15B is another enlarged view of part of the cart of FIG. 2A.

Referring to FIGS. 15A and 15B, the cart 20A has one or more shock absorbers 40. One shock absorber 40 is shown mounted to the base 22 and includes a resilient member 42 which engages the stop or movement limiter 19E to dampen a movement of the cart 20A. Another shock absorber 40 is mounted to one of the guide rails 16 to engage part of the base 22 of the cart 20A.

Referring to FIG. 1, there is disclosed a method for non-destructively testing the part 11. The method includes displacing the part 11 which is removably mounted to the cart 20 into the testing enclosure 12A of the NDT machine 10. The method includes temporarily preventing displacement of the cart 20 so as to secure the part 11 in position within the testing enclosure 12A. The method includes operating the NDT machine 10 to perform non-destructive testing of the part 11. The method includes displacing the part 11 by displacing the cart 20 away from the testing enclosure 12A.

The cart 20 disclosed herein helps to reduce the cycle times associated with analysing in the NDT machine 10, contributes to a safer work environment, and also helps to reduce the required "touch-time" during which an inspector must manually inspect the part 11. This may increase the amount of time available to the inspector to analyse complex inspection results, and may reduce the time spent performing repetitive manual work. The cart 20 also helps to reduce the amount of time programming the NDT machine 10 to test different parts, thereby freeing up hours and helping to increase the testing capacity of the NDT machine 10. The versatility of the mounting fixtures 29 and their use with various upright and horizontal supports 26,28,126,128,31,32 eliminate the need for special staging or scaffolding to prepare the parts 11 for inspection.

Before and after the part 11 is analysed in the NDT machine 10, it may need to be weighed. Weighing the part 11 provides confirmation that the part 11 has not been damaged or altered by the inspection process in the NDT machine 10.

One option for weighing the part 11 involves using an immersion bath. However, this process is time consuming, requires wastewater treatment, mechanical maintenance, chemicals and electricity associated with the immersion tank. Another option is directly weighing the part 11, such as on a weighing scale. However, many conventional scales cannot accommodate large parts 11 with complex geometries, and do not provide sufficient reliability when the parts 11 need to be weighed with a relatively high-degree of precision (for example, +/−0.01 lbs). Furthermore, it is difficult to keep some parts 11 in a fixed position on the scale, such that the scale may provide erroneous readings due to the effect that the movement or air or people has on the part 11.

FIG. 16 shows an example of a weighing system 200 used to weigh one or more parts 11. The weighing system 200 includes a support 202. The support 202 is any suitable structure used to support the part 11 during the weighing process. In FIG. 16, the support 202 is a cantilever. In FIG. 16, the support 202 takes the form of a beam 202A extending from a wall 201. Other configurations for the support 202 are possible. In another possible configuration, the support 202 is a rod, bar or mount attached to a ceiling and extending downwardly therefrom. In another possible configuration, the support 202 is a horizontal beam, rod, or other elongated objected attached at both its ends to walls 201. The support 202 in FIG. 16 is immobile. In other embodiments, the support 202 is mobile. In one possible mobile configuration, the support 202 is part of a cart which can displace and then be rendered immobile. Irrespective of the form or configuration of the support 202, the weighing system 200 also includes a load cell 204 mounted to the support. In FIG. 16, the load cell 204 is positioned beneath the support 202. The load cell 204 may be mounted to the support 202 in other ways as well. The load cell 204 is able to provide weight values with a sensitivity or precision of at least +/−0.01 lbs.

The weighing system 200 also has a part platform 206 which receives the one or more parts 11 to be weighed. The part platform 206 is suspended from the load cell 204 such that the part platform 206, and the parts 11 therein or thereon, will cause the load cell 204 to generate weight values due to the effect of gravity. In FIG. 16, the part platform 206 is positioned beneath the load cell 204. In FIG. 16, the part platform 206 hangs below and from the load cell 204.

The part platform 206 may take any shape or form, or have any component, to achieve such functionality. For example, and referring to FIG. 16, the part platform 206 includes a basket 206A. The basket 206A has walls 206B which define an open or closed enclosure to receive therein one or more parts 11 to be weighed. The walls 206B may have mounts 206C, such as hooks, loops, lugs, shelves, or other structure used to anchor or support the part 11 or portions thereof. The basket 206A in FIG. 16 is thus versatile, and provides a single and standard support for parts 11 of different sizes and geometries from a few inches to many feet in length, such that the parts 11 can be received in, or mounted to, the part platform 206. The part platform 206 in FIG. 16 also has one or more straps 206D with hooks or other anchors. The one or more straps 206D extend between the basket 206A and the load cell 204, and are used to stably suspend the basket 206A from the load cell 204. One or more of the straps 206D are pivotably mounted to the load cell 204 so that the basket 206A may twist or pivot.

The weighing system 200 may be used to weigh the parts 11 with precision, repeatedly and quickly. This is achieved by optimizing the frequency with which the load cell 204 takes measurements. When operating, the load cell 204 generates thousands of weight values per second for the part 11, and does so over a short period of less than twenty seconds. Each weight value is indicative of the weight of the part 11, and may have units such as lbs., kg or other suitable units. It is understood that the weight values generated by the load cell 204 take into account the weight of the part platform 206, as described in greater detail below, so that the relevant weight values are only those of the part 11. Thus, the load cell 204 is constantly acquiring weight data over a short period of time, such that the weighing operation is completed in a matter of seconds (less than twenty seconds).

The final weight of the part 11 is determined by taking the average of most or all of the weight values generated by the load cell 204 over the period of time. The average is the mean of the weight values, determined by adding most or all of the weight values and dividing it by the corresponding number of weight values that were added together. In an embodiment, the average weight value is determined by adding all of the weight values generated by the load cell 204 over the period of time and dividing it by the total number of weight values generated. The average weight value is outputted as the final weight of the part 11 by the load cell 204 or another system communicating therewith.

Referring to FIG. 16, there is disclosed a method of weighing the part 11 suspended from the load cell 204. The method includes generating thousands of weight values for the part 11 per second with the load cell over a period of less than twenty seconds. The load cell is operable to generate between 10,000 and 20,000 weight values for the part 11 per second. Other sampling frequencies for the load cell 204 are possible. In one possible configuration, the load cell 204 generates 10,000 weight values per second over a fifteen second period, resulting in a total number of 150,000 weight values generated over the period.

Before weighing the part 11, it may be desirable to calibrate the load cell 204 by weighing the part platform 206. The load cell 204 may therefore also be used to generate thousands of weight values per second for an empty part platform 206 (i.e. the part platform 206 without the part 11 within it, or mounted to it). The weight values for the empty part platform 206 may be generated with the load cell 204 for a period of about fifteen seconds, and the weight values may be averaged to provide a weight of the empty part platform 206. The weight of the empty part platform 206 may be designated as a zero-weight reference. The load cell 204, or the server with which it communicates, thus has a reference value for the weight of the part platform 206. The subsequent weight values of the part 11 plus the part platform 206 generated by the load cell 204 are compared to the zero-weight reference in order to determine the weight values of just the part 11 itself. In an alternate embodiment, the load cell 204 is not calibrated before weighing the part 11. In such an embodiment, the weight of the empty part platform 206 is a constant that may be programmed or provided to the load cell to be taken into account when it generates the weight values of the part 11.

Once the load cell 204 accounts for the weight of the empty part platform 206, the part 11 may be placed into, or mounted onto, the part platform 206, depending on the size and geometry of the part 11. The load cell 204 may then generate the thousands of weight values for the part 11 per second over the period of time desired. The weight values may then be averaged with the load cell 204, or another remote processor, to generate the weight of the part 11. In one possible configuration, the weight values are averaged over a period of fifteen seconds to generate the weight of the part, after which the weight measurement is done.

The weight of the part is then outputted by the load cell 204, or another remote processor or server, to any person or system wishing to know the weight of the part. The output may take any suitable form, including a visual display of the weight at the load cell 204 or another remote location, an audible indication of the weight, or any other form. In an embodiment, the output of the weight is a single, clear value of the weight of the part 11 provided in pounds or kilograms. In an embodiment, the output of the weight is not provided as a series of flashing or fluctuating numbers which over time settle as a single value. The operator of the weighing system 200 or the observer of the weight is thus not required to interpret the result by approximating or averaging multiple output values that may fluctuate in some convention systems. Furthermore, the weight information of the part 11 may be sent to a remote data server directly, without needing the operator to note down and re-type the value in another database. This reduces or prevents the likelihood of a typographical error or other type of error occurring. The operator may then press a "Send Data" button to communicate the weight information to a data server. The operator may then remove the part 11 from the part platform 206, and send the part 11 to the next process step. In an embodiment, the entire weighing process, from the calibration of the load cell 204 with information on the empty part platform 206 (if needed), to the weighing and outputting of the weight for the part 11, takes less than one minute.

The large number of weight values generated by the load cell 204 over a short period of time (less than twenty seconds), and the averaging of these values allows for "averaging out" any momentary disruption to the part platform 206 that might be caused by environmental or operating conditions in a typical assembly plant (changes in temperature, air movements, impact from someone, etc.). The weighing system 200 is thus able to provide a reliable weight for the part 11, quickly (less than twenty seconds) and repeatedly, while remaining virtually unaffected by disturbances (e.g. changes in temperature, air movements, impact from someone, etc.) that are common in a typical assembly plant. The weighing system 200 disclosed herein is simple to operate and does not require the operator to have any particular training or skill set.

It occurs in some assembly plants that thousands of parts 11 are weighed in a year, and it often takes an average of five minutes to weigh each part 11 using some conventional techniques. The weighing system 200 and method disclosed herein offer significant savings in time over the year when weighing thousands of parts 11 because the entire weighing process for each part 11 may be completed in less than one minute. This may lead to hundreds of labour hours being saved over a year when compared to weighing the same number of parts over the same time period using some conventional techniques. The weighing system 200 and method disclosed herein eliminate the need for some conventional techniques like an immersion bath or scale, and the disadvantages associated therewith.

Figure 17A:
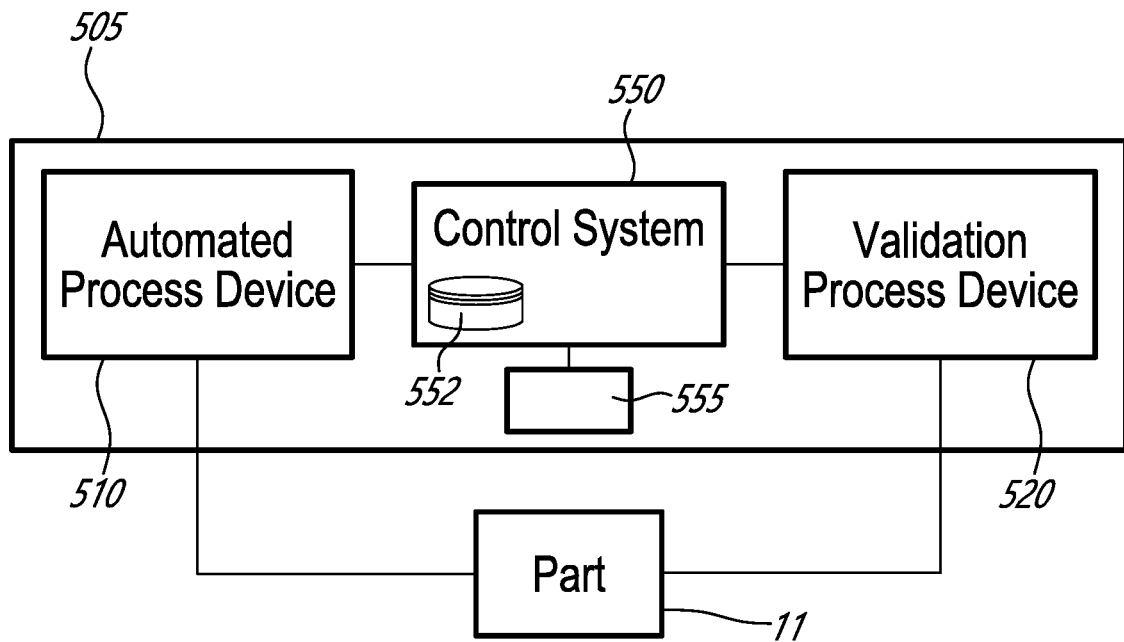
FIGS. 17A-B are block diagrams of example systems for performing a validation process on a part.

With reference to FIG. 17A, there is illustrated a system 505 for performing a validation process for a part, for instance the part 11. The system 505 is composed of an automated process device 510 and a validation process device 520, and additionally includes a control system 550, a data store 552, and an input device 555. Although illustrated here as a singular control system 550 and an associated singular input device 555, it should be noted that in some other embodiments, the system 505 may include multiple control systems and/or multiple input devices. The part 11 may be supported by one or more carts 20, which displace the part 11 through the automated process device 510.

The process implemented by the automated process device 510 may be any suitable process which is performed by an automated machine or device on the part 11. For example, the automated process device 510 may implement an NDT process, a curing process, a baking process, a milling process, or the like. The process performed by the automated process device 510 may be controlled by one or more robots, one or more computer numerical control (CNC) devices or systems, or the like. It should be noted that in certain embodiments, the automated process device 510 may implement a process which is partially automated, and which relies on an operator to perform, or assist in performing, one or more non-automated steps. The validation process implemented by the validation process device 520 may be any suitable process which serves to perform a validation regarding the part 11. For example, the validation process device 520 may implement a weighing process, a barcode scanning process, an inspection process, a report production process, or the like. The validation process performed by the validation process device 520 provides information regarding whether or not the part 11 meets certain requirements, or adheres to certain criteria. In some embodiments, the validation process may include, or consist of, the production of printed material which validates an identity of the part 11, or which validates that the automated process implemented by the automated process device 510 was appropriately completed. For example, the validation process device 520 may produce a label or tag which may be affixed to the part 11, which may identify the part 11 and include additional information, for instance relating to the processes performed by the automated process device 510.

Operation of the automated process device 510 and/or of the validation process device 520 may be effected, in whole or in part, by way of a control system 550, which is composed of one or more computing devices. The control system 550 interfaces with the automated process device 510 and/or the validation process device 520 in any suitable fashion, including via wireless and/or wired communication links, and using any suitable protocols. In this fashion, the control system 550 assists in implementing one or more automated processes via the automated process device 510, and/or one or more validation processes via the validation process device 520, at any given time. In some embodiments, one or more validation processes are included as part of any given automated process performed by the automated process device 510; thus, initiating an automated process via the control system 550 may in turn initiate one or more validation processes.

The control system 550 is provided with a data store 552, which may be any suitable type of data storage device or system, and may store any suitable amount of data in any suitable format. Although illustrated here as being internal to the control system 550, it should be understood that the data store 552 may be located remotely from the control system 550, and be accessible thereto using any suitable network.

The control system 550 may also be configured for obtaining input from one or more operators of the system 505, for instance via the input device 555. The input device 555 includes any suitable number of input mechanisms, including a mouse or other pointing device, a keyboard or other data entry device, a barcode scanner or other optical scanning device, an RFID scanner or other radio-frequency scanning device, or the like. In some embodiments, the input device 555 performs continuous or semi-continuous scans for input data. For instance, the input device 555 includes an always-on RFID scanner which continually scans for the presence of a readable RFID tag within a particular area. In some other embodiments, the input device 555 serves to provide the control system 550 with input data obtained from an operator using the system 505.

In operation, the control system 550 may be accessed by an operator to initiate an automated process and/or a validation process for a particular part 11. The control system 550 is provided with an input from the operator, via the input device 555, to initiate the automated process. In some embodiments, the control system 550 obtains one or more identifiers associated with the part 11, which can include a unique identifier, for example a serial number, and/or a semi-unique identifier, for example a part number or a lot number. The operator can use the input device 555 to scan or enter the identifier associated with the part 11 to provide it to the control system 550. For example, the operator can scan a barcode affixed to the part 11, or can scan an RFID tag affixed to or embedded within the part 11. Other approaches are also considered, for instance the operator entering a part number printed on the part 11 via a keyboard or other keypad.

In some embodiments, the control system 550 is provided with a number of predetermined automated processing programs for performing automated processes. For example, the automated processing programs are stored in the data store 552 and thereby accessible to the control system 550. When provided with the identifier associated with the part 11, the control system 550 generates a listing of one or more automated processes available for the part 11 based on the identifier. For example, if the identifier is a particular part number, the control system 550 generates a listing of all automated processing programs indicated as appropriate for the part number. In some embodiments, the listing generated by the control system 550 is a subset of the plurality of automated processes which are accessible to the control system 550. In some other embodiments, one or more listings are pre-established, and the control system 550 causes one of the pre-established listings to be displayed based on the identifier. In some further embodiments, a particular identifier may be associated with only one automated process. The control system 550 can present a listing with the single testing program, or can present a confirmatory screen to the operator listing the single testing program, and soliciting a confirmation from the operator that the displayed testing program should be initiated.

The automated processing programs may be generated prior to the automated processing by a manufacturer or other relevant party associated with the part 11. In some embodiments, the automated processing programs are provided with one or more selectable options or other modifications, which are entered by the operator via the input device 555. In some cases, an automated processing program can be devised by the operator via the input device 555, either from one or more pre-existing automated processing program segments, or by providing a list of automated processing steps to be performed. In some other cases, the automated processing programs may be updatable by a remote user, for instance a member of an engineering team, and the control system 550 can fetch updates to the existing automated processing programs in response to a corresponding operator input, for instance via the input device 555.

It should be noted that the control system 550 may be provided with any number of identifiers via the input device 555, which may be entered in sequence or concurrently by the operator. Additionally, in some embodiments the control system 550 is provided with identifiers from another computing device, for instance over a network, and creates a queue of automated processing programs based on the received identifiers. For instance, the operator can provide an input to the control system 550 to fetch one or more identifiers from the remote computer, for instance at the start of a work shift or the like, thereby indicating to the operator which parts 11 should be tested during their shift.

The listing obtained by the control system 550 may be presented to the operator via a display, which may form part of the input device 555, or may be separate therefrom. The display may also present information about currently ongoing automated processing programs, about automated processing programs in queue, and/or about ongoing and/or in-queue validation programs. This can include NDT processes, weighing processes, or any other suitable type of process, depending on what inputs the control system 550 has been provided. The input device 555 may receive input from the operator to remove one or more ongoing or in-queue testing programs, to modify one or more ongoing or in-queue testing programs, to reorder the in-queue testing programs, or the like. In some embodiments, the operator may also request additional information about ongoing or in-queue testing programs via the input device 555, which may be displayed in any suitable fashion.

In some embodiments, the input device 555 may also receive an indication from the operator regarding one or more malfunctioning testing programs. The control system 550, upon receiving the indication, takes steps to quarantine or otherwise remove the malfunctioning program(s) from listings of available programs, and prevent the malfunctioning program(s) from appearing in subsequently-generated listings, for instance in response to an operator scanning a part number into the control system 550 via the input device 555. For example, the quarantined program can be marked or flagged as being defective, such that the control system 550 knows not to present it in subsequently-generated listings. In some embodiments, when a testing program is quarantined, the control system 550 can issue an alert to a remote computing system associated with a party responsible for devising the testing programs. The alert can indicate which program was quarantined, contextual information about the quarantine, for instance the operator who placed the program in quarantine, the time at which the testing program was placed in quarantine, and the like, and any other suitable information which may assist the party to ascertain the cause of the quarantine and take any suitable corrective actions.

As described hereinabove, certain steps of the testing programs are performed at least in part by an operator, who may displace or position the part 11 within certain portions of the automated process device 510 and the validation process device. The control system 550 is configured for receiving input from the operator as the operator-assisted steps are being performed, indicating that the operator has initiated said steps. For instance, if a particular weighing process requires the operator to place the part 11 within the part platform 206 of the weighing system 200, the control system 550 receives an input via the input device 555 from the operator indicating that the part 11 has been placed within the part platform 206. Similarly, when the operator has placed the part 11 in the body 12 of the NDT machine 10, the operator provides an input to the control system 550 via the input device 555. The control system 550 generates tracking information of the operations performed by the operators, which are stored in the data store 552.

In order to ensure traceability of operations performed on parts 11 which undergo one or more automated processes and/or one or more validation processes, the control system 550 is configured for generating and storing tracking information regarding the parts 11 and the various programs to which they are subjected in the data store 552. Tracking information may be generated by the control system 550 in response to receiving input via the input device 555, in response to information provided by the automated process device 510 and the validation process device 520, or in any other suitable fashion. For example, when an operator provides an identifier of the part 11 to the control system 550 and selects a particular automated process for the part 11, the control system 550 produces tracking information linking the identifier to an associated automated processing program, and stores this information in the data store 552.

Additionally, as the part 11 is subjected to various steps in the automated process, the operator may provide additional input via the input device 555, which the control system 550 can use to generate additional tracking information for storage in the data store 552. The tracking information may be used to improve quality assurance for the part 11, and to ensure that all steps outlined as part of the testing program are properly performed. It should be noted that tracking information can also be generated from the various steps performed as part of a validation process.

Once an automated process completes, the control system 550 may be provided with additional input from the operator via the input device 555, indicating that the final step(s) of the automated process has been completed. The control system 550 can then complete the tracking information associated with the part 11. In some embodiments, when the tracking information is completed, the control system 550 can transmit it to an external system or database for storage or validation. Alternatively, or in addition, the tracking information can be stored within the data store 552 with a particular flag or other indication which signifies that the testing program has been completed. Similar steps may be performed following completion of a validation process.

It should be noted that the control system 550 is also configured for controlling operation of the automated process device 510 and the validation process device 520. The control system 550 provides instructions to the automated process device 510 and regarding the nature of the part 11 being inspected, the type of support structure being used, and the like, as well as instructions on the type of automated process to be performed. The control system 550 also provides instructions to the validation process device 520, including how to perform the validation, what values to collect, and the like. Information generated by the automated process device 510 and the validation process device 520 may also be obtained by the control system 550, which may be included in the tracking information generated by the control system 550.

In some embodiments, the automated process device 510 is initiated in response to an operator input, for instance via the input device 555. The operator identifies the type of process to perform, which is associated with a respective processing program. The operator may also provide additional information, including selecting one of a plurality of automated process devices 510, providing various parameters, and the like, prior to initiating the process performed by the automated process device 510. In some other embodiments, the automated process device 510 may be initiated in response to termination of another process, or in response to receiving a command to initiate the automated process device 510 from another device or system. For instance, a first automated process device 510 in a first system 505 can initiate a second automated process device 510 in a second system 505 which is communicatively coupled to the first system 505. In a particular application, an implementation of the automated process device 510 consists of performing one or more NDT processes via the NDT machine 10.

The process performed by the validation process device 520 may be automated in whole or in part, or may be performed in whole or in part by an operator. Similarly to the automated process device 510, the validation process device 520 may be initiated in response to an operator input, for instance via the input device 555, or may be initiated by another device or system. For example, the automated process device 510 commands the validation process device 520 to perform one or more validation processes at particular moments while the automated process is being performed. In another example, the automated process device 510 commands the validation process device 520 to perform a validation process before, and optionally after, the automated process is performed by the automated process device 510. In a particular application, an implementation of the validation process device 520 consists of performing one or more weighing processes via the weighing system 200.

Figure 17B:
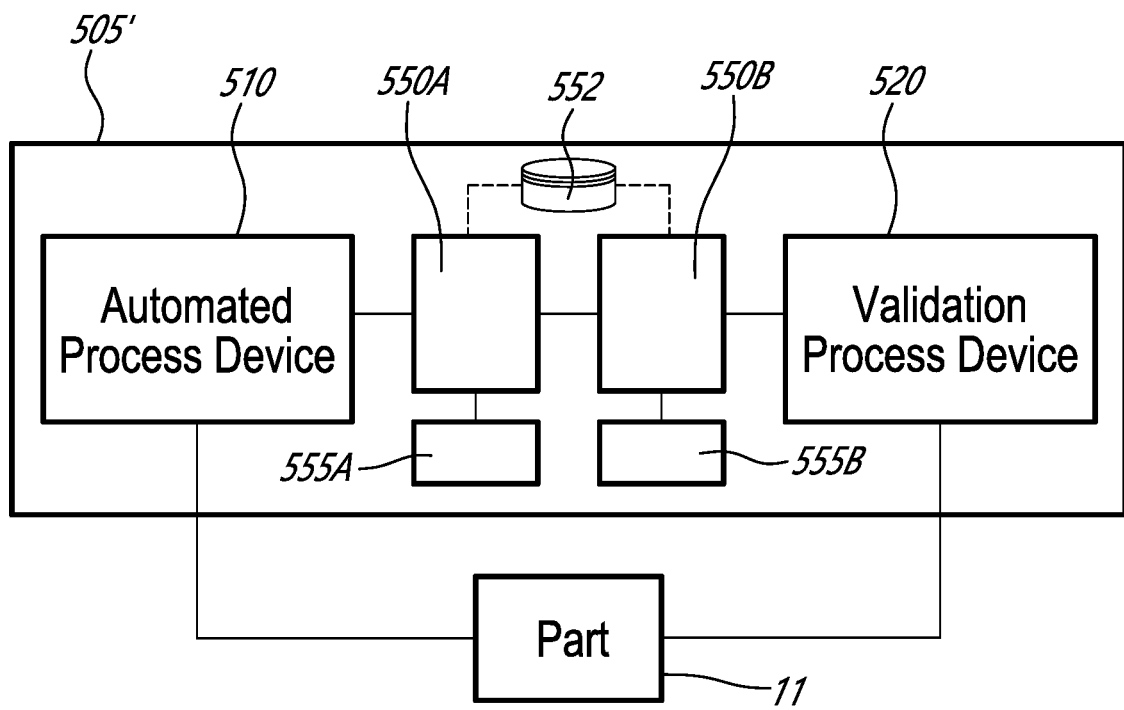

With additional reference to FIG. 17B, in an alternative embodiment, there is provided a system 505' for performing a validation process for a part, for instance the part 11. In the system 505', the control system 550 is split into two components, indicated at 550A and 550B, each with associated input devices, indicated at 555A and 555B. The operation of the control systems 550A and 550B is substantially similar to that of the control system 550. However, the control system 550A is responsible for effecting control of the automated process device 510, and the control system 550B is responsible for effecting control of the validation process device 520. In some embodiments, the control systems 550A, 550B can both access the data store 552 to store information therein. In some other embodiments, access to the data store 552 is provided to one of the control systems 550A, 550B. For example, if control system 550A is communicatively coupled to the data store 552, control system 550B can send tracking information to control system 550A, which then stores the tracking information in the data store 552.

Figure 18:
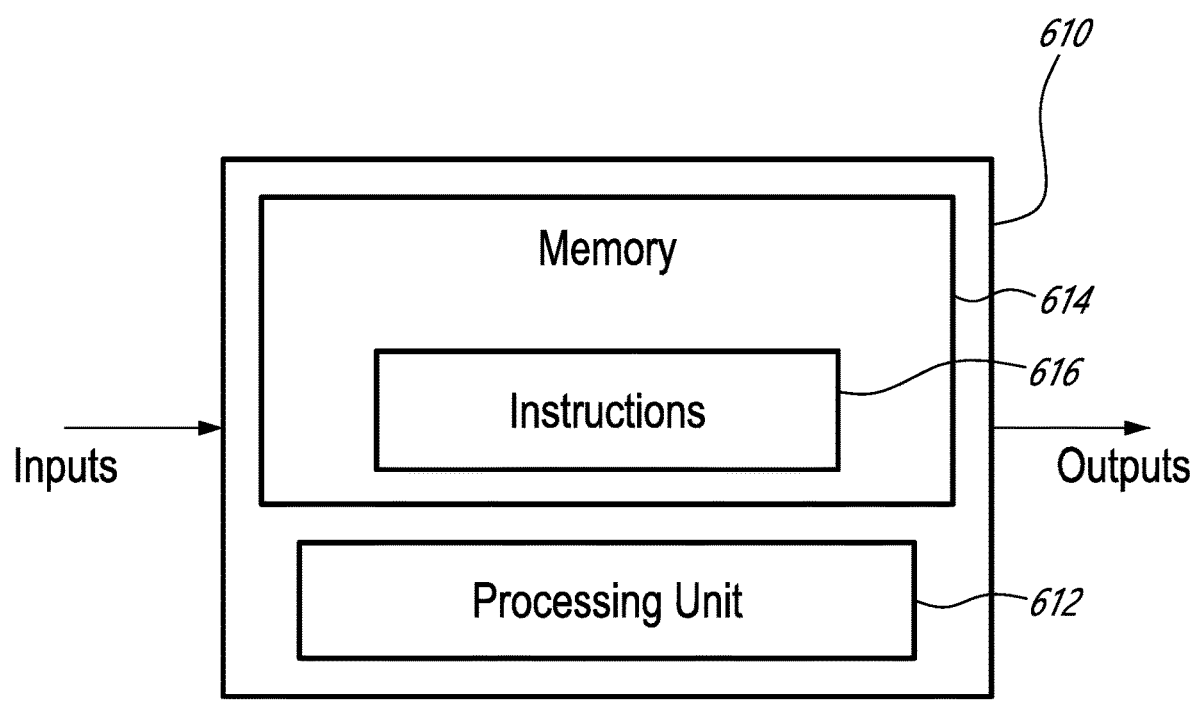
FIG. 18 is a block diagram of an example computing system.

With reference to FIG. 18, part or all of the control system 550 (and the control systems 550A, 550B) may be implemented by a computing device 610, as an example embodiment. The computing device 610 comprises a processing unit 612 and a memory 614 which has stored therein computer-executable instructions 616. The processing unit 612 may comprise any suitable devices configured to implement the functionality of the control system 550 (and the control systems 550A, 550B) such that instructions 616, when executed by the computing device 610 or other programmable apparatus, may cause the functions/acts/steps performed by the control system 550 (and the control systems 550A, 550B) and as described herein to be executed. The processing unit 612 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 614 may comprise any suitable known or other machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 612.

Figure 19:
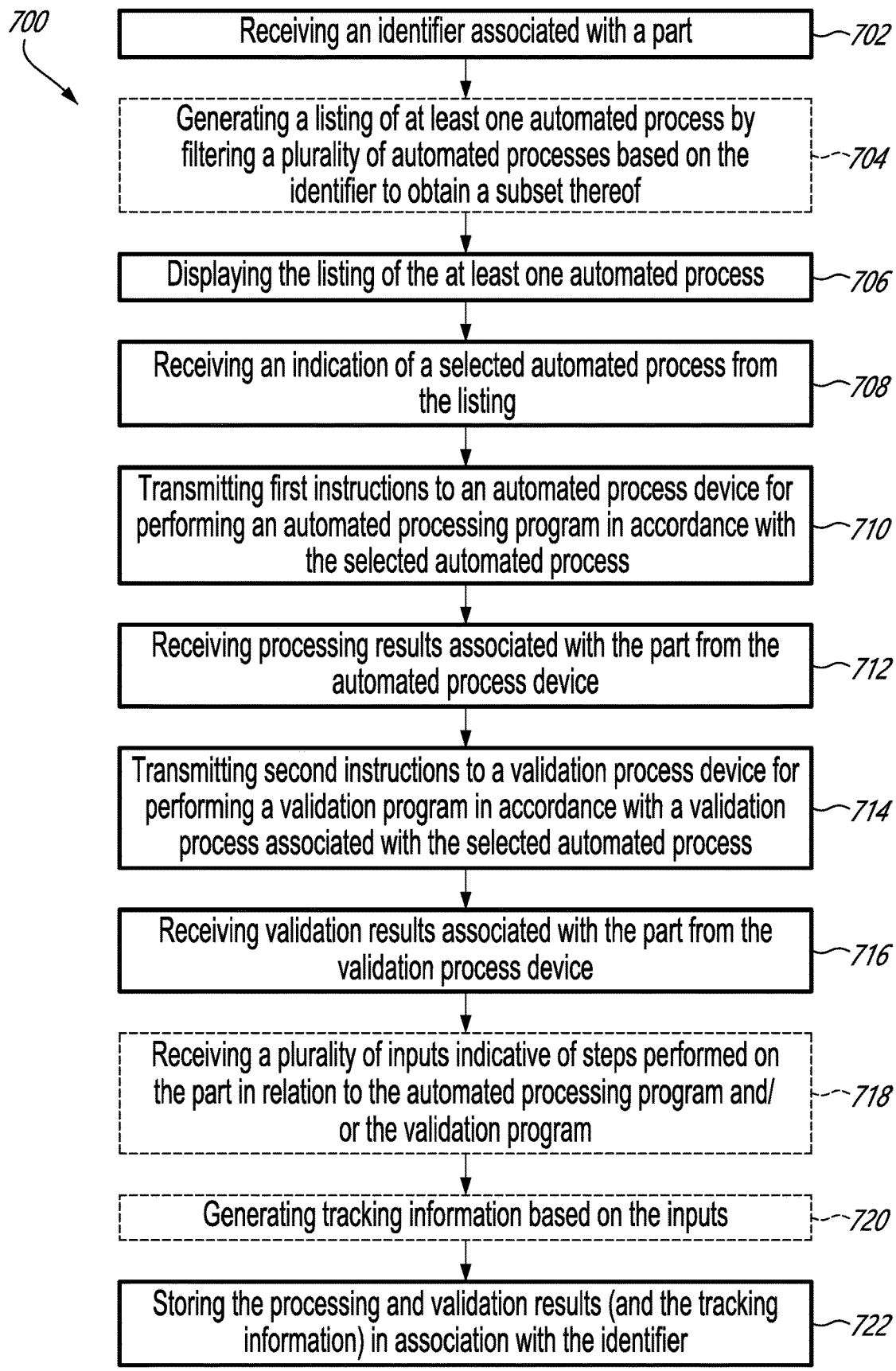
FIG. 19 is a flowchart illustrating an example method for performing a validation process on a part.

With reference to FIG. 19, there is illustrated a method 700 for performing a validation process on a part to be processed, for instance the part 11. The method 700 may be implemented by the control system 550, the control system 550A, and the control system 550B, depending on the operating context. For simplicity, the foregoing discussion will refer to the control system 550, though it should be understood that reference thereto is not intended to be limiting.

At step 702, the method 700 comprises receiving an identifier associated with the part 11. The identifier can be a unique identifier associated with the part 11, or a semi-unique identifier which is associated with the part 11 and with any number of other parts. The identifier can be received via an input interface associated with the control system 550, for instance the input device 555.

At step 704, in some embodiments the method 700 comprises generating a listing of at least one automated process program based on the identifier. The listing is a subset of a plurality of testing programs which are available to the control system 550. For example, the control system 550 can generate the listing by filtering a plurality of automated processes, associated with any suitable number of programs, which are listed as compatible with the identifier. Other approaches are also considered.

At step 706, the method 700 comprises displaying the listing of the at least one automated process. The listing can be displayed via a screen or other display device, which may form part of the input device 555, for instance as part of a touchscreen or the like, or may be separate therefrom.

At step 708, the method 700 comprises receiving an indication of a selected automated process from the listing. The indication can be received via the input device 555 in any suitable fashion. In some embodiments, the indication can also specify particular parameters or options for the associated automated processing program, which may be selectable via the input device 555.

At step 710, the method 700 comprises transmitting first instructions to an automated process device for performing an automated processing program in accordance with the selected automated process. The automated process device can include the NDT machine 10, or some other device which performs an automated process. The instructions can include an indication of processes to be performed, indications of any options or parameters provided by the operator via the input device 555, or any other suitable information.

At step 712, the method 700 comprises receiving processing results associated with the part 11. The processing results are received from the automated process device 510, which can be the NDT machine 10, or another device which performs an automated process. The processing results can include any suitable information provided by the automated process device 510, which can include conclusions of the automated process, granular processing results, and the like. In some embodiments, the processing results can also include information about the time at which the automated process was performed, about the operational and environmental conditions in which the automated process was performed, about the operator(s) who performed or initiated the automated process, about the automated process device 510 used to perform the testing, and the like.

At step 714, the method 700 comprises transmitting second instructions to a validation process device for performing a validation program in accordance with a validation process associated with the selected automated process. The automated process device can include the weighing system 200, or some other device which performs a validation process. The instructions can include an indication of processes to be performed, indications of any options or parameters provided by the operator via the input device 555, or any other suitable information.

At step 716, the method 700 comprises receiving validation results associated with the part 11. The validation results are received from the validation process device 520, which can be the weighing system 200, or another device which performs a validation process. The validation results can include any suitable information provided by the validation process device 520, which can include the result of a comparison between validation results and a benchmark or reference value, granular validation results, and the like. In some embodiments, the validation results can also include information about the time at which the validation process was performed, about the operational and environmental conditions in which the validation process was performed, about the operator(s) who performed or initiated the validation process, about the validation process device 520 used to perform the testing, and the like.

At step 718, in some embodiments the method 700 comprises receiving a plurality of inputs indicative of steps performed on the part 11 in relation to the automated processing program and/or the validation program. The inputs can indicate that the part 11 has been loaded into a cart 20 of the NDT machine 10 or part platform 206 of the weighing system 200, that a particular automated processing program and/or the validation program has begun for the part 11, that the part 11 has been unloaded from the cart 20 or the part platform 206, or the like. In some cases, the inputs are provided via the input device 555 at predetermined moments during a testing program. In some other cases, the inputs are provided in response to certain events occurring. Other approaches are also considered.

At step 720, in some embodiments the method 700 comprises generating tracking information based on the inputs. The tracking information can include a confirmation that particular steps occurred as part of the automated processing program and/or the validation program, can include an indication of which operator performed the steps, or entered the information (e.g. a name or unique identification number), a timestamp indicating when the step was performed, or when the information was entered, an indication of which device or other equipment was used to perform the step, and the like. The tracking information can be generated in any suitable format, and can be generated concurrently with the inputs being provided (at step 712), or upon completion of the testing program (e.g., at the completion of the method 700).

At step 722, the method 700 comprises storing the processing and validation results, and in some embodiments the tracking information, in association with the identifier. The processing and validation results and the tracking information can be stored in any suitable database, for instance the data store 552, and can be stored in association with the identifier in any suitable format. For example, a database entry can be created for the identifier, and the database entry is populated with the processing and validation results and, where suitable, the tracking information. In this fashion, traceability for the testing program performed using the automated process device 510 and/or the validation process device 520 can be provided. The database entry can be accessed to review and/or validate that proper steps were taken, that proper information was collected, and that the obtained information is in line with established standards.

It should be noted that in certain embodiments, certain steps of the method 700 may be repeated, or performed in an order different than that presented in FIG. 19. For example, the method 700 may be implemented with steps 714 and 716 implemented a first time prior to steps 710 and 712. Afterwards, steps 714 and 716 are repeated—that is to say, after step 712. In another example, multiple automated process and validation processes can be performed in succession on a common part 11. The same database entry can be edited to store all the information generated as part of the repeated implementations of the method 700 and/or of one or more steps thereof, such that the database entry contains the necessary information for evaluating any automated processes and/or validation processes performed on the part 11. Other approaches, including with multiple database entries for a single part 11, are also considered.

Figure 20:
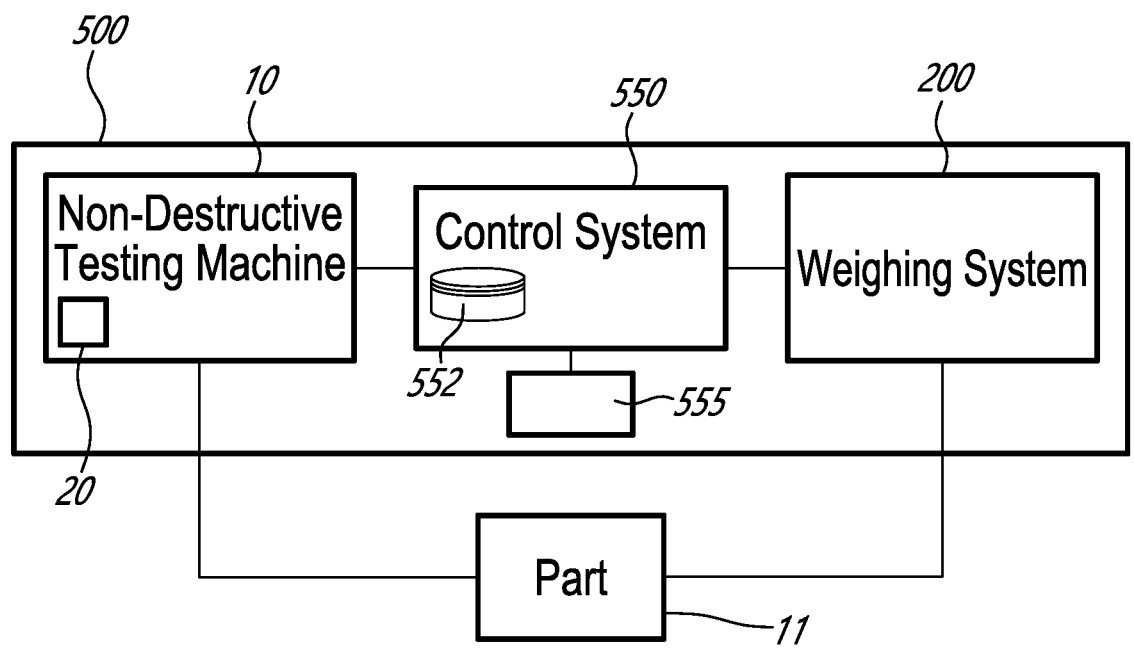
FIG. 20 is a block diagram of an example system for performing non-destructive testing (NDT) on a part.

With reference to FIG. 20, in one example embodiment, the system 505 is a system for performing NDT, illustrated at 500. The system 500 includes the NDT machine 10, described hereinabove, which may be used to perform testing, inspection, or other operations on the part 11. The part 11 may be supported by one or more carts 20, which displace the part 11 through the NDT machine 10. The system 500 also includes the weighing system 200, described hereinabove, which may also be used to perform testing, inspection, or other operations on the part 11, including weighing the part 11. Thus, the system 500 can be used to implement the method 700 of FIG. 19, wherein the automated process device 510 is substituted for the NDT machine 10, and the validation process device 520 is substituted for the weighing system 200. In this implementation, the automated processing program is an NDT program which produces NDT results, and the validation program is a weighing program which provides weighing results.

It should be noted that the control system 550 is also configured for controlling operation of the NDT machine 10 and the weighing system 200. The control system 550 provides instructions to the NDT machine 10 regarding the nature of the part 11 being inspected, the type of cart 20 being used, and the like, as well as instructions on the type of NDT to be performed. The control system 550 also provides instructions to the weighing system 200, including when to start and stop collecting weight values, as described hereinabove in relation to FIG. 14. Information generated by the NDT machine 10 and the weighing system 200 may also be obtained by the control system 550, which may be included in the tracking information generated by the control system 550.

The system 500 described in FIG. 20, similarly to the systems 505 and 505' of FIGS. 17A-B, is also configured for receiving input from the operator and/or from the automated process device 510 and the validation process device 520, as various steps are performed as part of the automated process and the validation process. The control system 550, as described previously, generates tracking information of the operations performed by the operators, which are stored in the data store 552, or in another database, as appropriate.

The methods and systems described herein may be implemented in a high level procedural or object oriented programming or scripting language, or a combination thereof, to communicate with or assist in the operation of a computer system, for example the computing device 610. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 612 of the computing device 610, to operate in a specific and predefined manner to perform the functions described herein.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

What is claimed is:

1. A test station for non-destructive testing of aerospace components, comprising: a weighing system having a support being static, a load cell mounted to the support, and a part platform suspended from the load cell to receive an aerospace component to be weighed, the load cell operable to generate thousands of weight values for the aerospace component per second over a period of less than twenty seconds, the support remaining at a constant position during the period of less than twenty seconds, the load cell operable to output a weight of the aerospace component by averaging the weight values over the period of less than twenty seconds.

2. The test station of claim 1, wherein the load cell is operable to generate between 10,000 and 20,000 weight values for the aerospace component per second.

3. The test station of claim 1, wherein the support is a cantilever fixed at one end to an upright wall.

4. The test station of claim 1, wherein the support is immobile.

5. The test station of claim 1, wherein the load cell is operable to generate the weight values with a precision of at least +/−0.01 lbs.

6. The test station of claim 1, wherein the part platform includes a basket having walls being interconnected and delimiting an enclosure to receive the aerospace component, one or more of the walls having mounts to attach the aerospace component to the basket.

7. The test station of claim 1, comprising one or more straps mounted to the load cell and to the part platform to suspend the part platform from the load cell.

8. The test station of claim 7, wherein the one or more of the straps are pivotably mounted to the load cell.

9. A method of testing an aerospace component, the method comprising:
    suspending the aerospace component from a load cell mounted to a support being static and disposed in a testing facility; and
    weighing the aerospace component, including:
        generating thousands of weight values for the aerospace component per second with the load cell over a period of less than twenty seconds while the support remains at a constant position during the period;
        averaging the weight values over the period of less than twenty seconds to generate a weight of the aerospace component; and
        outputting the weight of the aerospace component.

10. The method of claim 9, wherein generating thousands of weight values for the aerospace component includes generating thousands of weight values for the aerospace component with a precision of at least +/−0.01 lbs.

11. The method of claim 9, comprising completing the method of weighing the aerospace component in less than one minute.

12. The method of claim 9, comprising generating thousands of weight values per second for an empty part platform for receiving the aerospace component before generating the thousands of weight values for the aerospace component.

13. The method of claim 12, wherein generating the thousands of weight values per second for the empty part platform includes generating the thousands of weight values per second for the empty part platform over a period of about fifteen seconds to generate a weight of the empty part platform.

14. The method of claim 13, comprising setting the weight of the empty part platform as a zero-weight reference.

15. The method of claim 14, comprising placing the aerospace component into or onto the part platform and then generating the thousands of weight values for the aerospace component per second with the load cell over the period of less than twenty seconds.

16. The method of claim 9, comprising averaging the weight values over a period of fifteen seconds to generate the weight of the aerospace component.

17. The method of claim 9, wherein outputting the weight of the aerospace component includes visually outputting a single value of the weight of the aerospace component in pounds or kilograms.

18. The method of claim 9, wherein outputting the weight of the aerospace component includes communicating the weight of the aerospace component directly to a data server without first visually displaying the weight of the aerospace component.

19. The method of claim 9, wherein outputting the weight of the aerospace component includes communicating the weight of the aerospace component to a data server.

* * * * *